(12) United States Patent
Risser et al.

(10) Patent No.: US 9,007,742 B2
(45) Date of Patent: Apr. 14, 2015

(54) SUPERCAPACITOR MATERIALS AND DEVICES

(75) Inventors: Steven M. Risser, Reynoldsburg, OH (US); Vincent D. McGinniss, Columbus, OH (US); Bing Tan, Ann Arbor, MI (US); Kevin B. Spahr, Columbus, OH (US); Homero Castenada-Lopez, Stow, OH (US)

(73) Assignee: Battelle Memorial Institute, Columbus, OH (US)

( * ) Notice: Subject to any disclaimer, the term of this patent is extended or adjusted under 35 U.S.C. 154(b) by 763 days.

(21) Appl. No.: 13/262,621

(22) PCT Filed: Mar. 31, 2010

(86) PCT No.: PCT/US2010/029515
§ 371 (c)(1),
(2), (4) Date: Dec. 14, 2011

(87) PCT Pub. No.: WO2010/120560
PCT Pub. Date: Oct. 21, 2010

(65) Prior Publication Data
US 2012/0153887 A1    Jun. 21, 2012

Related U.S. Application Data

(60) Provisional application No. 61/165,491, filed on Mar. 31, 2009.

(51) Int. Cl.
H01G 9/00 (2006.01)
H01M 4/02 (2006.01)
(Continued)

(52) U.S. Cl.
CPC ............... *H01G 9/058* (2013.01); *H01G 9/155* (2013.01); *H01G 11/46* (2013.01); *H01G 11/86* (2013.01); *Y02E 60/13* (2013.01)

(58) Field of Classification Search
USPC .................. 361/502, 503; 264/104; 29/25.03; 429/209, 523; 320/101
See application file for complete search history.

(56) References Cited

U.S. PATENT DOCUMENTS 5,654,567 A * 8/1997 Numata et al. ................. 257/306
5,908,713 A * 6/1999 Ruka et al. ..................... 429/484
(Continued)

FOREIGN PATENT DOCUMENTS

JP    2007181278 A    7/2007

OTHER PUBLICATIONS

Ding et al., (Ding) (Journal of the Electrochemical Society, 151 (12) A2007-A2015 (2004).*
(Continued)

*Primary Examiner* — M'Baye Diao
(74) *Attorney, Agent, or Firm* — Frank Rosenberg; C. Michael Gegenheimer

(57) ABSTRACT

Capacitors containing novel electrodes and electrolytes are described. One electrode composition comprises an oxide of Mn and Fe in a Mn:Fe molar ratio of 3:1 to 5:1. Another electrode composition comprises an oxide comprising Ni, Co, and Fe; wherein the Ni and Co are present in a Ni/Co molar ratio in the range of 0.5 to 2 and a Fe and Ni are present in a Ni/Fe molar ratio in the range of 1.0 to 10. The resulting capacitors can be characterized by superior properties. Methods of forming the electrodes from gels are also described. An electrolyte comprising a Li salt in a carbonate solution, wherein the carbonate solution comprises 10-30% ethylene carbonate and 70-90% propylene carbonate is also described.

16 Claims, 32 Drawing Sheets

(51) Int. Cl.
*H01M 10/44* (2006.01)
*H01G 9/04* (2006.01)
*H01G 11/46* (2013.01)
*H01G 11/86* (2013.01)

(56) References Cited

U.S. PATENT DOCUMENTS

| | | | |
|---|---|---|---|
| 6,339,528 B1 | 1/2002 | Lee | |
| 6,849,208 B1* | 2/2005 | Stoller et al. | 252/519.1 |
| 6,921,732 B2* | 7/2005 | Vempati | 502/66 |
| 8,747,800 B2* | 6/2014 | Sudoh et al. | 423/448 |
| 2006/0143883 A1* | 7/2006 | Yamada et al. | 29/25.03 |
| 2011/0003192 A1* | 1/2011 | Kuze et al. | 429/144 |

OTHER PUBLICATIONS

Lee et al., (Lee) (Journal of the Electrochemical Society, 154 (9) A875-A881 (2007).*

Information disclosure statement (IDS) form for U.S. Appl. 13/262,621.

International search report for PCT/US2010/029515, dated Aug. 31, 2010.

Written opinion of the international searching authority for PCT/US2010/029515, dated Sep. 30, 2011.

Kuo S-L and Wu NL, "Electrochemical capacitor of MnFe2O4 with NaCl electrolyte", Electrochemical and Solid-State Letters, 2005, 8(10), A495-A499.

Kuan-Xin et al., "Electrodeposition of nickel and cobalt mixed oxide/carbon nanotube thin films and their charge storage properties", J. Electrochem. Soc., 2006, 153, A1568-A1574.

Piao et al., "Intercalation of lithium ions into graphite electrodes studied by AC impedance measurements", J. Electrochem Soc., 1999, 146, 2794-2798.

Kim et al., "Synthesis and characterization of MnO2-based mixed oxides as supercapacitors", J. Electrochem. Soc., 2003, 150 D56-D62.

Jayalakshmi et al., "Hydrothermal synthesis of SnO2-V2O5 mixed oxide and electrochemical screening of carbon nano-tubes (CNT), V2O, V2O5-CNT, and SnO2-V2O5-CNT elctrodes for supercapacitor applications", J. Power Sources, 2007, 166, 578-583.

* cited by examiner

SUPERCAPACITOR MATERIALS AND DEVICES

RELATED APPLICATION

This application is a national stage filing and claims the priority benefit of PCT/US2010/029515 filed 31 Mar. 2010 and also claims the benefit of priority U.S. Provisional Patent Application Ser. No. 61/165,491, filed 31 Mar. 2009.

BACKGROUND

Conventionally, electrical power has usually been stored in batteries. Another device for storing energy is a capacitor, and more recently the so-called supercapacitor. Very substantial efforts have been made to develop improved capacitors for storing electrical energy.

The requirement for capacitance is the ability to separate charge at a specified potential. The prototypical capacitor consists of two metal plates, with a potential difference between the plates. In the charged state, one plate will have a net positive charge, the other a net negative charge. The capacitance can be determined from the area of the plates and the separation between the plates. Placing a solid dielectric material between the plates increases the capacitance, as the same potential difference between the plates leads to larger net charge on each plate.

Recent developments in capacitor technology have led to replacement of the metal plates with high surface area conductive materials, such as carbon, and replacement of the solid dielectric with a liquid electrolyte. In case of carbon electrodes, the capacitance arises from the double layer mechanism, where the ions in the electrolyte move adjacent to the electrode surface. In this case, the capacitance increases due to two factors, the increase in the area of the electrode due to the porosity, and the decrease in the charge separation distance.

The recent developments in synthesis of high surface area materials have also led to the development of capacitors based on a second mechanism, the so-called faradaic capacitors. The faradaic capacitors are composed of a solid state electrode with a liquid electrolyte. The operation principle of these capacitors is based on reversible reactions at the interface at certain potential. There are different characteristics of the second type of capacitors; the charge transfer reaction occurs at the interface of the outer porous layer, the substrate (current collector) is different material than the external layer. The ions are integrated in the structure of the high surface area material (commonly an oxide or nitride) by reacting either by substitution or by integration of the ion within the structure of the material. To cite just one example, see Piao et al. "Intercalation of Lithium Ions into Graphite Electrodes studied by AC Impedance measurements," J. Electrochem Soc. 146, 2794-2798 (1999). The stability will depend on the reversibility of this reaction (or process). If the reduction or oxidation process consumes more species than the reversible reaction, or if there is another species formed at the surface, the reversibility is modified.

Recently, a third type of capacitor, the "hybrid" capacitor has also been reported. In this capacitor, both the double-layer and the faradaic mechanism are used, to provide enhanced capacitance, and to take advantage of operational advantages of each mechanism.

The solid state electrode can be composed of a nanoporous transition metal compound placed on a high surface area conductive medium, such as carbon black, or carbon nanotube (CNT) films, combined with a binder to ensure physical integrity. If the ions move into the transition metal compound, the capacitance mechanism is faradaic, or possibly hybrid, while if the ions do not enter the transition metal compound the mechanism is purely double layer.

There are numerous reports in the prior art describing methods of forming electrodes from composites of carbon and metal oxides or mixed metal oxides. For example, Kim et al. in "Synthesis and Characterization of $MnO_2$-Based Mixed Oxides as Supercapacitors," J. Electrochem. Soc. 150 D56-D62 (2003) describe the preparation of Mn/Pb and Mn/Ni mixed oxides by reduction of KMnO4 with Pb and Ni salts. Jayalakshmi et al. in "Hydrothermal synthesis of $SnO_2$—$V_2O_5$ mixed oxide and electrochemical screening of carbon nano-tubes (CNT), $V_2O_5$, $V_2O_5$—CNT, and $SnO_2$—$V_2O_5$—CNT electrodes for supercapacitor applications" J. Power Sources 166 (2007) 578-583 report the preparation of mixed metal oxides for electrodes by hydrothermal synthesis. Walker et al. in "Sol-gel synthesis of hydrous ruthenium oxide nanonetworks from 1,2-epoxides," J. Solid State Chemistry 180 (2007) 2290-2297 reported the synthesis of a RuO2 xerogel formed by the addition of propylene oxide to ruthenium chloride in ethanol. A report on the use of propylene oxide to form a mixed metal oxide is by Cui et al., "A sol-gel route using propylene oxide as a gelation agent to synthesize spherical $NiAl_2O_4$ nanoparticles" J. Non-Cryst Solids 351 (2005) 2102-2106. Kuan-Xin et al. in "Electrodeposition of Nickel and Cobalt Mixed Oxide/Carbon Nanotube Thin Films and Their Charge Storage Properties," J. Electrochem. Soc., 153, A1568-A1574 (2006) reported a method of electrochemically depositing a mixed metal oxide on a film of carbon nanotubes.

A liquid electrolyte is either aqueous, with a high concentration of acid, base, or salt, or non-aqueous with a salt dissolved in an organic or inorganic solvent. There are a wide variety of solvents and salts are available for such use, offering specific advantages depending on the application being considered (e.g., low temperature vs. high temperature). Ionic liquids based on the imidazolium cation have recently received attention as nonaqueous electrolytes in various electrochemical devices (Koch et al., J. Electrochem. Soc. 143: 155, 1996). These electrolytes have significant advantages compared to the numerous quaternary onium salts that have been previously investigated for use in carbon double-layer capacitor.

Electrochemical capacitors based on nonaqueous electrolytes offer greater electrochemical stability (up to 4 V) compared to aqueous systems (limited to approximately 1V), thereby providing greater energy storage ($E=\frac{1}{2} CV^2$). However, due to the lower conductivity of nonaqueous electrolytes compared to aqueous systems, lower power capabilities are observed. In addition, with the porous materials used in electrochemical capacitors, the high viscosity typically associated with the high dielectric constant solvents used in non-aqueous electrolytes is detrimental to conductivity in porous electrodes. Furthermore, the lower ion concentrations typically obtained with nonaqueous electrolytes result in increased electrolyte volume requirements for packaged devices.

U.S. Pat. No. 6,339,528 describes a capacitor made by in-situ formation of $MnO_2$ on carbon black and various ratios of MnO2, carbon black and PTFE binder. In the data presented, there appear to be no correlations between the volume of $MnO_2$ with the volume of carbon black or the volume of PTFE. There are no correlations with any of the variables with the specific capacitance results.

Despite extensive research and development, there remains a need for improved capacitors for the storage of energy.

SUMMARY OF THE INVENTION

In a first aspect, the invention provides a capacitor comprising: an electrode, and wherein the electrode comprises: a metal oxide comprising Mn and Fe in a molar ratio of 3:1 to 5:1. In some preferred embodiments, the electrode comprises Mn and Fe in a molar ratio of 3.5:1 to 4.5:1, and in some embodiments, a molar ratio of 4:1. In some embodiments, the transition metals in the metal oxide consist essentially of Mn and Fe. In some embodiments, the electrode comprises 5 weight % or less of binder. In some embodiments, the electrode comprises carbon, for example in the form of carbon black and/or carbon nanotubes. As shown in the examples, electrode performance is affected by the size of the electrode; thus, in some preferred embodiments, the electrode has a mass in the range of 0.1 to 2 mg. In some preferred embodiments, the electrode comprises 40 to 80 weight % metal oxide nanoparticles and 15 to 60 weight % carbon. In some preferred embodiments, the electrode comprises at least 5 weight % carbon nanotubes. In some preferred embodiments, the metal oxide further comprises Ni, Co, or a combination of Ni and Co.

Any of the inventive capacitors (or electrode in the capacitor) may also be characterized by any of its properties, for example, wherein the metal oxide is characterizable by an absorption band in the infrared region between 1000 and 1100 $cm^{-1}$; or In general, the inventive capacitors (or electrode in the capacitor) can be characterized by any of the properties shown in the examples, either based on a selected range of properties shown in the figures, or using a selected demonstrated property to form the basis for a minimum or maximum level of a property. For example, in some preferred embodiments the electrode comprises a specific capacitance of at least 500 F/g if measured at 1 mV/s in 1M KOH aqueous electrolyte. The conditions described in the examples may be used to define the conditions under which a selected property is to be measured.

The capacitor may also be characterizable by an x-ray diffraction spectrum in which the peaks due to a crystalline hydroxide compound are larger than the peaks due to crystalline oxide compounds.

In another aspect, the invention provides a capacitor comprising: an electrode, and wherein the electrode comprises: a metal oxide comprising Ni, Co, and Fe; wherein the Ni and Co are present in a Ni/Co molar ratio in the range of 0.5 to 2 and Fe and Ni are present in a Ni/Fe molar ratio in the range of 1.0 to 10. In some preferred embodiments, the electrode further comprises Mn.

The invention further provides a capacitor comprising: a first electrode as described in any of the aspects described herein; an electrolyte; a second electrode; and a circuit that can form an electrical pathway between the first electrode and the second electrode. In some preferred embodiments, the electrolyte is a nonaqueous liquid. In some preferred embodiments, the first and second electrodes have substantially the same composition.

In another aspect, the invention provides a capacitor, comprising: two electrodes; an electrolyte between the electrodes; wherein the electrolyte comprises a Li salt in a carbonate solution, wherein the carbonate solution comprises 10-30% ethylene carbonate and 70-90% propylene carbonate. In some preferred embodiments, the carbonate solution comprises 15-25% ethylene carbonate and 75-85% propylene carbonate. In some preferred embodiments, the Li salt comprises $LiBF_4$, $LiPF_6$ or a combination of $LiBF_4$ and $LiPF_6$. In some preferred embodiments, at least one of the electrodes comprises metal oxide nanoparticles in a carbon matrix. The capacitor preferably comprises a porous polymeric separator disposed between the electrodes. In some preferred embodiments, the metal oxide comprises vanadium oxide, iron oxide, iron-manganese oxide, iron-nickel oxide, iron-copper oxide, cobalt-manganese oxide, manganese-titanium oxide, $BaFeO_4$, or combinations thereof.

In another aspect, the invention provides a method of making an electrode, comprising: forming a composition comprising Mn and Fe in a molar ratio of 3.5:1 to 4.5:1; reacting the composition to form a gel comprising Mn and Fe in a molar ratio of 3.5:1 to 4.5:1; drying the gel to obtain a powder comprising Mn and Fe in a molar ratio of 3.5:1 to 4.5:1; and compacting the powder to form an electrode. In some embodiments, gel is dried in the presence of supercritical $CO_2$ to form an aerogel. In some embodiments, the step of reacting comprises reaction with an epoxide. In some preferred embodiments, the temperature of the process never exceeds 200° C., so that the powder comprising Mn and Fe remains substantially amorphous.

In a further aspect, the invention provides a method of making a capacitor comprising: providing two electrodes; providing an electrolyte between the electrodes; wherein the electrolyte comprises a Li salt in a carbonate solution, wherein the carbonate solution comprises 10-30% ethylene carbonate and 70-90% propylene carbonate.

The invention also provides methods of storing energy comprising: applying a potential to any of the capacitors described herein, removing the potential; and wherein, after the potential is removed, an electrical potential persists between the electrodes.

In another aspect, the invention provides a method of making a capacitor, comprising: providing a carbon electrode in a first Li-containing solution; intercalating Li into the electrode to form a Li-intercalated electrode; removing the electrode from the first Li-containing solution; and placing the Li-intercalated electrode into a second Li-containing solution. The second Li-containing solution is typically part of a supercapacitor that comprises the other components of a supercapacitor.

In a further aspect, the invention provides a method of making an electrode, comprising: forming a solution comprising carbon particles and a dissolved metal compound; reacting the metal compound to form a gel; converting the gel into metal oxide nanoparticles; combining the metal oxide nanoparticles with a binder; and compacting the metal oxide nanoparticles and binder into an electrode. In some embodiments, the solution comprises Mn and Fe in a molar ratio of 3:1 to 5:1. In some embodiments, the solution is gelled by the addition of an epoxide. In some embodiments, the solution comprises Mn, Co and Fe.

The invention also includes electrodes formed by any of the methods described herein, and/or capacitors comprising any of the electrodes. In preferred embodiments, the capacitors and/or electrodes can be described with reference to the properties described in the examples. For example, in some preferred embodiments, the capacitors possess a stability such that they exhibit substantially no change in capacitance after 100 cycles. The invention also includes devices comprising the capacitors; for example a solar energy system comprising a photovoltaic cell connected to the capacitor. The invention also includes methods of storing energy using any of the capacitors described herein.

The capacitors can be characterized by their properties including specific capacitance, energy density, stability, high voltage and storage capabilities.

The invention can be described with the word "comprising" meaning "including," and when "comprising" is used, the invention also includes narrower, alternative embodiments, in which "comprising" is replaced by the terms "consisting essentially of" or "consisting of".

GLOSSARY

In reference to the carbonate solution, "%" refers to % by liquid volume measured at 40° C. For example, a solution made by mixing 4 ml ethylene carbonate and 6 ml propylene carbonate (at 40° C.) would be 40% ethylene carbonate and 60% propylene carbonate. In a solution, the amount of each component could be determined by spectroscopy or quantitative gas chromatography and then calculating the volume of each pure component at 40° C. (the volume percent would then be the volume of one component divided by the sum of each component's volume).

An "Electrode" is a well-known term that refers to a conductive component of a capacitor that contacts the electrolyte.

"Electrolyte" is a composition comprising one or more ionic species and a medium through which ions can move. In preferred embodiments, the electrolyte comprises a non-aqueous liquid, preferably containing less than 100 ppm water, and containing a dissolved salt.

"Intercalating" refers to the reversible inclusion of lithium into an electrode.

"Ionic species" means an ion, or a compound that forms an ion as part of an electrolyte (i.e., forms an ion under conditions in the capacitor; for example, a carboxylic acid can be converted to an ion in the appropriate solvent).

"Lithium salts" are well known materials for use in electrolytes and include compounds such as $LiN(SO_2CF_3)_2$, $LiBF_4$ or $LiPF_6$.

Metal oxides comprise transition metal atoms connected by bridging oxygen atoms. Metal oxide particles may also contain other atoms such as B, N, C, Al, Zn, etc. Metal oxides will often also comprise hydroxyl groups which diminish in concentration with heating. In some preferred embodiments, metal oxides consist essentially of transition metals (or metal), oxygen, and, optionally, H in the form of hydroxides.

"Mixed metal oxides" are metal oxides comprising at least two different transition metals.

"Nanoparticles" are particles in the size range of 1 to 1000 nm, preferably in the range of 1 to 100 nm.

A "separator" is a porous sheet placed between the positive and negative electrodes in an electrolyte. Its function is to prevent physical contact of the positive and negative electrodes while serving as an electrolyte reservoir to enable free ionic transport. Typically, the separator is a polymeric or ceramic microporous membrane or a nonwoven cloth. The microporous membranes are preferably 25 um or less in thickness and have an average pore size of 1 μm or less (volume average).

"Transition metals" have the standard IUPAC definition of "an element whose atom has an incomplete d sub-shell, or which can give rise to cations with an incomplete d sub-shell."

For purposes of the present invention, a capacitor (or supercapacitor) that includes a separator has the general structure illustrated in FIG. 1A. Note that the electrodes may include any of the electrodes described herein and may not be formed as a single homogeneous mass as depicted in the figure. Also note that the energy in this depiction is stored through a double layer mechanism. The capacitors of this invention may also incorporate energy storage through the intercalation of charge into the electrode materials. Note further that, although a separator is typically desirable for structural stability, in some highly rigid structures is possible to omit the separator. The two electrodes are also connected, or connectable, to an external circuit that is the energy source during charging and is where useful work can be done during discharge of the capacitor.

DETAILED DESCRIPTION OF THE INVENTION

Figure 1A:
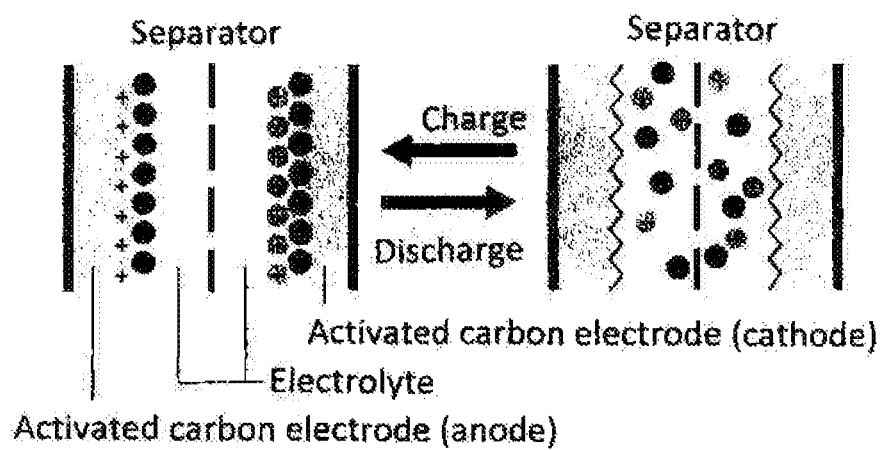
FIG. 1A is a schematic illustration of a double layer capacitor.

Solid state electrodes for supercapacitors can be formed, for example, from oxides, hydroxides, sulfides, phosphates (or combinations thereof) with transition metals such as Manganese, Iron, Cobalt, Nickel (or combinations thereof) with CNT and/or carbon black in different ratios.

A preferred electrode of the present invention comprises oxides of Fe and Mn having a Mn and Fe in a molar ratio of 3:1 to 5:1, more preferably a molar ratio of 3.5 to 4.5, and in some embodiments, a molar ratio of 4:1. Additional transition metal elements may also be present in the metal oxide; for example, Ni, Co, or a combination of Ni and Co.

In an alternative embodiment, an electrode comprises a metal oxide comprising Ni, Co, and Fe; wherein the Ni and Co are present in a Ni/Co molar ratio in the range of 0.5 to 2 and Fe and Ni are present in a Ni/Fe molar ratio in the range of 1.0 to 10. The metal oxide can contain additional elements. In some preferred embodiments, the electrode further comprises Mn.

In addition to the oxide in particle form, the electrodes typically contain carbon particles as the conductive phase. Carbon materials are well known, and a variety of carbon particles may be used in the electrodes. In some preferred embodiments, the carbon material comprises carbon nanotubes (CNTs), in some embodiments at least 5 weight % CNTs as a percent of the mass of the electrode. In some preferred embodiments, the electrode comprises 40 to 80 weight % metal oxide particles (preferably nanoparticles) and 15 to 60 weight % carbon.

Typically, it is necessary to add a binder in order to form the electrode in a desired shape. Binders for making electrodes are known. Nonlimiting examples of binders include: PTFE, Nafion, Epoxy resin, Polyvinylidene fluoride (PVDF), Polyvinylidene fluoride-hexafluoropropylene (PVDF-HEP), $ZrO_2$, and $TiO_2$. Since binders reduce conductivity, when binders are present, it is preferred to keep them at a level of 5 mass % or less of the electrode's mass.

A supercapacitor also includes an aqueous or nonaqueous electrolyte. Examples of nonaqueous solvents for electrolytes include propylene carbonate (PC), ethylene carbonate (EC), dimethyl carbonate (DMC), diethyl carbonate (DEC), 1,2-dimethoxyethane (DME) and 1,2-diethoxyethane (DEE). As is known in the art, electrolytes further comprise a salt. In the present invention, the salts preferably contain Li ions and counter ions such as $PF_6^-$, $BF_4^-$. Although the relative amounts of ethylene carbonate and propylene carbonate were not previously known to affect the properties of a capacitor, we have surprisingly discovered that superior results can be obtained with the electrolyte comprises 10-30% ethylene carbonate and 70-90% propylene carbonate. In some preferred embodiments, the carbonate solution comprises 15-25% ethylene carbonate and 75-85% propylene carbonate. The electrolyte can be used in conjunction with electrodes containing a metal oxide, preferably mixed with carbon. In some preferred embodiments, the metal oxide comprises vanadium oxide, iron oxide, iron-manganese oxide, iron-nickel oxide, iron-copper oxide, cobalt-manganese oxide, manganese-titanium oxide, $BaFeO_4$, or combinations thereof.

The electrodes may be characterized by any of the properties described in the examples. For example, a specific capacitance (or, alternatively, total capacitance) of the same level or greater than that shown in the examples.

The inventive capacitors are especially useful for storing energy from renewable energy sources such as solar, wind, and tidal. In these systems, charge is stored during periods of high energy production, and can be used when little or no energy is being collected. The capacitor may have parallel plates. Alternatively, the capacitor can be in the form; for example, the electrodes and separators can be alternately stacked, wound into a roll, and electrolyte poured in, then sealed to form a supercapacitor energy storage device.

The electrodes can be made using mixed metal oxides that are obtained by the sol-gel method to obtain a xerogel or aerogel which can then be ground into a powder and incorporated into an electrode. It has been discovered that an electrode with superior properties can be obtained when the carbon material is mixed in solution with a metal compound prior to formation of the gel. Epoxides have been found to work well to react with the metal compound(s) to form a gel.

Alternatively, the mixed metal oxides can be made by a hydrolysis method, such as that described in the examples.

The mixed metal oxides are preferably not heated above 250° C., more preferably not heated above 200° C., and in some embodiments not heated above 100° C. Contrary to a prior art report for $Fe_2Mn$ oxide (see Kuo et al., "Electrochemical characterization on MnFe2O4/carbon black composite aqueous supercapacitors," J. Power Sources 162 (2006) 1437-1443), we have surprisingly discovered that heating reduces specific capacitance.

EXAMPLES

Electrochemical Characterization

Figure 1B:
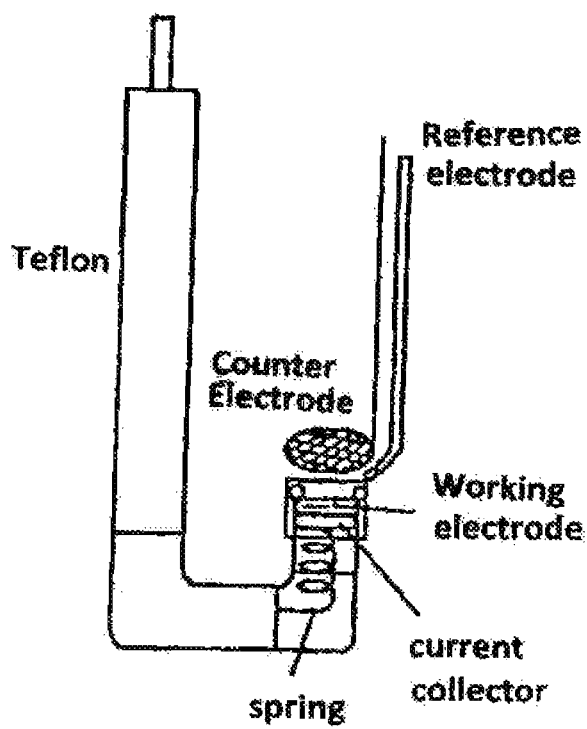
FIG. 1B illustrates a half cell design for measuring electrochemical properties.

The fabricated electrodes were characterized to determine their capacitance, voltage window, open circuit potential, and other parameters. FIG. 1*b* shows a half-cell configuration used for measuring the capacitance of the electrodes.

The general sequence of experiments used to characterize the electrodes includes the following steps:
  Open circuit potential with time (1 h)
  Electrochemical Impedance Spectroscopy (10 mV amplitude) 10 KHz to 0.01 Hz
  Cyclic voltammetry (aqueous solutions 0.7V vs. SCE to −0.7 vs. SCE)
  Analysis of the results (currents, voltage and capacitance)

The values of specific capacitance reported here are measured using cyclic voltammetry. Although some electrodes have been characterized for 100 voltage cycles or more, the reported capacitance is routinely determined from the second voltage cycle.

Comparison to Literature Capacitance Measurements

Two types of capacitance values will be reported here, the total capacitance and the specific capacitance. The specific capacitance is the total capacitance divided by the mass of the electrode, and so has units of F/g. The specific capacitance is often reported in the literature, as a measure of how effectively charged is being stored in or adjacent to the electrode. The total capacitance is of the most interest, as a measure of the value of the material for commercial applications.

Care must be exercised when comparing the data of this invention to data reported in the open literature. The common practice in the literature is to report the specific capacitance of metal oxide electrodes by dividing the measured capacitance by the mass of the metal oxide only. The largest capacitance values that are reported typically occur when the oxide is approximately 10% of the total electrode mass. For example, in 2006 *J. Electrochem. Soc. pp. A*1451, the authors present data for the capacitance of vanadium oxide deposited onto CNT films, when measured at a scan rate of 1 mV/sec, as shown in Table 1.

TABLE 1

Specific capacitance of V2O5 on CNT films taken from the literature.

| % mass of V2O5 | Capacitance using Vanadium mass | Capacitance using total electrode mass |
|---|---|---|
| 8.9 wt % | 1230 F/g | 109.5 F/g |
| 33.9 wt % | 650 F/g | 220.4 F/g |
| 51.3 wt % | 310 F/g | 159 F/g |

From Table 1, we see that the reported best value of 1230 F/g for the vanadium oxide capacitance is actually from the electrode with the lowest total capacitance. In many cases, the conductive component of the electrode will contribute double layer capacitance, which should also be accounted for. In cases where the transition metal compound is only 10% of the electrode mass, the double layer capacitance can be of the same order of magnitude as the faradaic component.

To avoid these complications, all specific capacitance values reported in this document will be based on the total mass of the electrode, including the binder and the conductive component.

Metal Oxide/Hydroxide Synthesis and Characterization

There were two primary approaches used to synthesize the metal nanoparticles, either a hydrolysis process, or a xerogel process. For some materials, both approaches were used. In all cases, the particles are expected to have a high degree of hydroxide nature, as the drying occurs at a temperature below that normally needed to completely convert the hydroxide to oxide. These materials will be referred to generically as oxides throughout the text. In cases where the material is labeled with elements and numbers, such as Fe1Cu2, this indicates the oxide was formed at a nominal starting molar ratio of one Fe to two Cu. Representative synthesis methods for the oxides are included below.

Sample Synthetic Methods

Preparation of Iron Oxide/Hydroxide Aerogel 4.39 g $FeCl_3.6H_2O$ and 1.17 g water were dissolved in 20 g ethanol. 10 g propylene oxide (PPO) was added quickly into the alcoholic solution under stiffing with a gel forming in less than 16 minutes. The formed gel was aged with sealing for several days at room temperature. The solvent (ethanol and water) in the gel was exchanged with acetone at least three times (one day one time). The acetone exchanged gel was finally dried by supercritical $CO_2$.

Iron-cobalt mixed oxide/hydroxide, iron-manganese mixed oxide/hydroxide and iron-nickel mixed oxide/hydroxide were prepared in a similar fashion, starting from:

2.20 g $FeCl_3.6H_2O$, 1.86 g $CoCl_2.6H_2O$, and 0.59 g water were dissolved in 20 g ethanol (iron-cobalt oxide/hydroxide);

2.20 g $FeCl_3.6H_2O$, 1.54 g $MnCl_2.4H_2O$, and 0.59 g water were dissolved in 20 g ethanol (iron-manganese oxide/hydroxide); and 2.20 g $FeCl_3.6H_2O$, 1.85 g $NiCl_2.6H_2O$, and 0.59 g water were dissolved in 20 g ethanol (iron-nickel oxide/hydroxide).

Preparation of Vanadium Oxide/Hydroxide Aerogel 0.6 g $VO(OPr)_3$ was dissolved in 8 g isopropanol. The solution was then cooled with ice. 1.8 g water was added to the cold alcoholic solution with stiffing. A gel formed within several minutes. The wet gel was aged and treated with acetone before supercritical CO2 drying as for iron-based gels.

Preparation of Vanadium-Iron Mixed Oxide/Hydroxide Aerogel 0.6 g $VO(OPr)_3$ was dissolved in 5 g ethanol. 0.664 g $FeCl_3.6H_2O$ was added to the ice-cold alcoholic solution. 1.2 g water was added after $FeCl_3$ was dissolved, then 2 g propylene oxide was added and a gel formed within 1 minute. The wet gel was aged and treated with acetone before supercritical CO2 drying as for iron-based gels.

Preparation of vanadium-manganese mixed oxide/hydroxide aerogel 0.6 g $VO(OPr)_3$ was dissolved in 8 g ethanol. 0.486 g $MnCl_2.4H_2O$ and 1.2 g water were added to the ice-cold alcoholic solution, and a gel was obtained after sitting overnight. The wet gel was aged and treated with acetone before supercritical CO2 drying as for iron-based gels.

Preparation of Fe—Cu Mixed Oxide Xerogel 2.20 g $FeCl_3.6H_2O$, 1.39 g $CuCl_2.2H_2O$, and 0.62 g water were dissolved in 20 g ethanol. 10 g propylene oxide (PPO) was added quickly into the alcoholic solution under stirring. A gel was formed within 15 minutes. The formed gel was dried in air for 2 days, dried at 50° C. for 2 days, and dried at 50° C. under vacuum for 1 day.

Preparation of Co—Mn Oxide Xerogel 1.86 g $CoCl_2.6H_2O$, 1.54 g $MnCl_2.4H_2O$, and 1.50 g water were dissolved in 20 g ethanol. 10 g propylene oxide (PPO) was added quickly into the alcoholic solution under stirring. The solution was left in air until it was dried. The soft precipitate was dried at 50° C. for 2 days, and dried at 50° C. under vacuum for 1 day.

Preparation of Mn Oxide Xerogel 0.145 g fumaric acid was dissolved in 10 g water under heating. When the solution was still warm, 0.59 g KMnO4 was added under stirring. A gel formed within 2 minutes. The formed gel was soaked in 0.1 M $H_2SO_4$ twice and then rinsed with ethanol. A black powder was obtained after drying the gel at 50° C. for 2 days, and then 50° C. under vacuum for 1 day.

Preparation of Mn—Ti Mixed Oxide Xerogel 3.52 g manganese acetylacetonate, 2.45 g titanium ethoxide (95%), 0.11 g HCl (37%) were dissolved in 9.2 g isopropanol, then 15 ml aqueous ammonia (28%) was added to the above solution under stiffing. A gel formed within 5 minutes. The formed gel was dried in air for one day, dried at 50° C. for 2 day, and dried at 50° C. under vacuum for 1 day.

Preparation of $BaFeO_4$ 100 ml 2 M KOH solution was cooled by ice bath with bubbling of $N_2$. 0.25 g $K_2FeO4$ was added to the above solution with stiffing. $N_2$ was continued to bubble through the solution for more than 5 minutes. In another beaker, 0.313 g barium acetate was dissolved in 80 ml water. The solution was cooled with ice and bubbled with N2 for more than 15 minutes. The solution of K2FeO4 was added into barium acetate solution under fast stirring. The precipitates were washed and collected by centrifuge after aged for 15 minutes in the solution. The collected precipitates were dried in oven at ~100° C. for overnight, then the dried powder was washed with copious acetic acid to dissolve any barium carbonate impurity. The acid washed powder was finally dried in oven at ~100° C. to remove the acetic acid.

Preparation of "in-situ" FeMn$_4$-AB Mixed Oxide Xerogel 2.20 g FeCl3.6H$_2$O, 6.44 g MnCl2.4H$_2$O, and 0.59 g water were dissolved in 20 g ethanol. 0.40 g Acetylene Black was added into the solution and was ultrasonically dispersed. 15 g propylene oxide was quickly added into the alcoholic solution under stirring. The solution was stirred for several minutes and then left static overnight. The formed gel was dried in an oven at 50° C. over several days.

Preparation of Metal Oxides by Hydrolysis

A 0.1M solution of the hydrous metal oxides was stirred rapidly while slowly adding 0.3M NaOH solution. An equal volume amount of 0.3M NaOH solution was added and was sufficient to increase the pH of the hydrous metal oxide solution to >7 pH. During the addition of the 0.3M NaOH a precipitate forms and at 7 pH, the hydrous metal oxide is completely converted to the oxide form. The precipitated metal oxide is then centrifuged at 3000 RPM for 30 minutes. A clear supernatant is decanted and distilled water is added to replace the volume decanted. The precipitated metal oxide is shaken vigorously for several minutes to disperse the metal oxide and wash before being centrifuged a second time. The slightly colored liquid is decanted and the metal oxide was dried in a 100° C. oven for 12 hours.

Characterization of Metal Oxides by Hydrolysis

Samples of the oxides were analyzed for composition and surface area. A sample of FeMn4 was prepared as described above, and the composition analyzed using EDS, as shown in Table 2. All results in weight % and are normalized. The accelerating voltage was 15 kV and the live time was 180 seconds.

TABLE 2

Composition of FeMn4 determined by EDS

|  | O | Cl | Mn | Fe | Total |
|---|---|---|---|---|---|
| Composition | 39.0 | 15.9 | 36.4 | 8.7 | 100.0 |

BET analysis was performed on several different synthesized samples. All samples were degassed at 50° C. under vacuum for more than 8 hours. The BET surface area was calculated from the adsorption data. The measurements were made using a Micromeritics ASAP 2010. The Fe—Mn aerogel sample was determined to have a surface area of 319 m$^2$/g. The Mn—V aerogel sample was determined to have a surface area of 73 m$^2$/g. The V$_2$O$_5$ aerogel was determined to have a surface area of 71 m$^2$/g.

Electrode Fabrication

Electrodes for testing were fabricated using the following procedure:
  The metal oxide was ground by hand to a fine powder.
  The conductive component (if used) was added to the oxide powder and ground again.
  Approximately 20 mg of the powder was added to a mortar, then the appropriate amount of binder was added from a 5% in solvent mixture.
  Approximately 150 mg of 1-methyl-2-pyrroidinone (NMP) was added.
  The mixture was again ground to form a paste. The paste was then applied to the collector substrate (stainless steel in most examples).
  The metal oxide on stainless steel electrode was then heated for 1 hour at 100 C. until all solvents evaporated.
  A Nylon filter disc was then placed over the dried metal oxide electrode. The electrode/filter disc assembly was then placed in the electrochemical apparatus for measurement.

The filter disc is used to ensure the electrode stays in place in the test cell. The filter disk has sufficient porosity that it should not alter the diffusion of charge or electrolyte. Several different conductive media were used, including acetylene black (AB), Ketjen black (KB), multi-wall carbon nanotubes (CNT), polypyrrole doped onto TiO$_2$, and polypyrrole mixed with carbon black. The active area of the Ni current collectors used for aqueous measurements is approximately 1 cm$^2$, while the active area of the stainless steel collectors used for all non-aqueous measurements is approximately 1.12 cm$^2$.

Another important physical property of the electrode is its porosity. In cases where a significant fraction of the electrode mass is composed of porous carbon, we expect the overall porosity will be dominated by the porosity of the carbon. As an example of this, we have measured thickness for several electrodes. For an electrode with measured thickness 50 microns, the volume would be approximately 0.01 cm$^3$ (assuming uniform thickness). For an electrode mass of 2 mg, this would correspond to a density of 0.2 g/cm$^3$. The 0.5 mg of carbon would have a volume of ~0.5×10$^{-3}$ cm$^3$ assuming density of 1 g/cm$^3$, and the metal oxide/hydroxide would have a volume of 0.5×10$^{-3}$ cm$^3$ assuming a density of ~3 g/cm$^3$. These combine for a volume of 10$^{-3}$ cm$^3$, which is ⅒$^{th}$ of the measured volume. This corresponds to a porosity of 90%. In some embodiments of the invention, any of the electrodes described herein can have a porosity of 70% or greater, in some cases 80% or greater, and in some embodiments, 90% or greater.

Prior Art Example 1

Scan Rate Dependence of Vanadium Oxide

Figure 2:
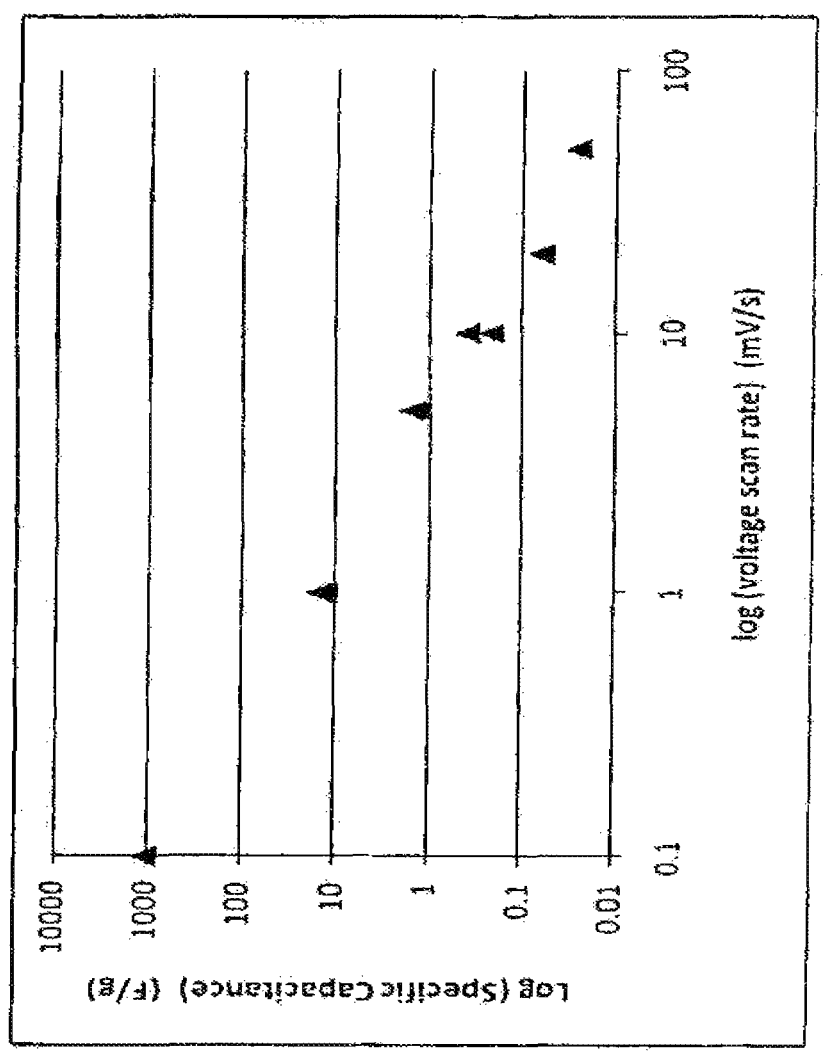
FIG. 2 illustrates specific capacitance of vanadium oxide as a function of voltage scan rate.

We demonstrate the relation between specific capacitance and scan rate for vanadium oxide. Electrodes were fabricated using vanadium oxide synthesized with the xerogel procedure, using the standard electrode fabrication procedures described previously. The nominal electrode composition is 70 wt % oxide, 25 wt % AB, and 5 wt % binder (Nafion). FIG. 2 shows the specific capacitance as a function of voltage scan rate for three electrodes fabricated using vanadium oxide. The measurements were taken at different scan rates for each electrode. The vanadium oxide shows a very large dependence on the voltage scan rate, with the specific capacitance of about 1000 F/g at 0.1 mV/s, but less than 20 F/g at a 1 mV/s scan rate. The likeliest explanation for this behavior is the high resistivity of the vanadium oxide, preventing rapid charge transfer at the fast voltage scan rates.

Figure 3:
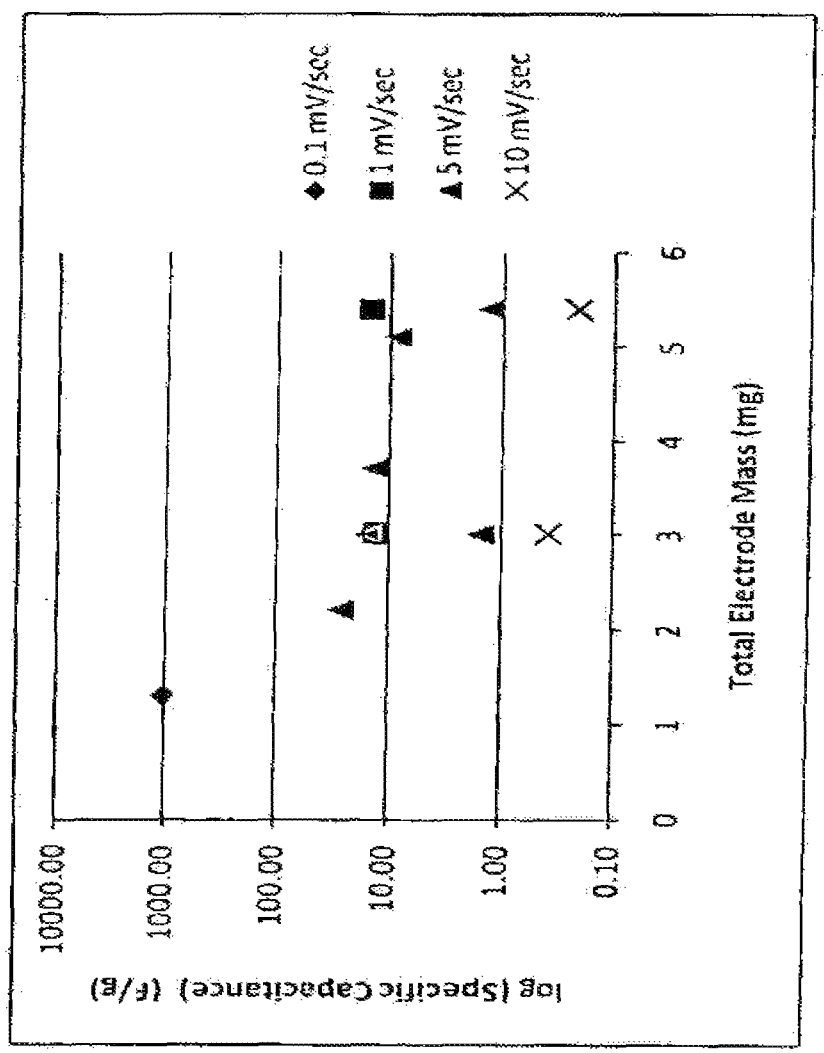
FIG. 3 illustrates scan rate dependence of the specific capacitance of vanadium oxide electrodes.

We demonstrate the relation between specific capacitance and scan rate for vanadium oxide. Electrodes were fabricated using vanadium oxide synthesized with the xerogel procedure, using the standard electrode fabrication procedures described previously. The nominal electrode composition is 70 wt % oxide, 25 wt % KB, and 5 wt % binder. FIG. 3 shows the specific capacitance for electrodes fabricated using vanadium oxide. Each electrode was measured at one or more voltage scan rate. Again, there is a strong dependence on the electrode mass, with specific capacitance increasing with decreasing electrode mass. The data in FIG. 3 is also consistent with FIG. 2, showing that the specific capacitance also decreases rapidly with increasing scan rate. The electrodes were fabricated using approximately the same weight fractions of oxide, conductive material and binder.

Prior Art Example 2

Dependence of Vanadium Oxide Weight Fraction

Figure 4:
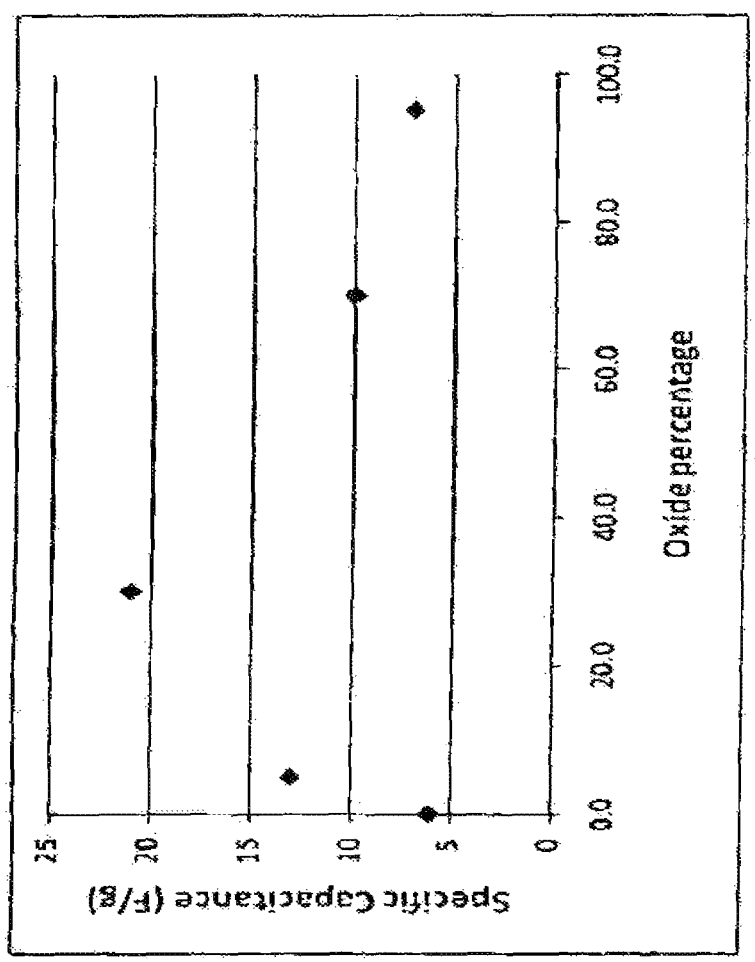
FIG. 4 illustrates the dependence of specific capacitance of vanadium oxide electrodes as a function of composition.

We demonstrate the relation between specific capacitance and vanadium oxide weight fraction. Electrodes were fabricated using vanadium oxide synthesized with the xerogel procedure, using the standard electrode fabrication procedures described previously. FIG. 4 presents the specific capacitance for a series of vanadium oxide electrodes, where the weight fraction of oxide was varied systematically. The binder content (Nafion) was 5 wt % for all electrodes. At long times without binder, the vanadium electrode dissolved in the 1M KOH. All capacitance measurements were taken at a 10 mV/s voltage scan rate. The results show the specific capacitance is largest when the electrode is 65% carbon black. Note that using the standard literature practice, the capacitance value for 5% oxide would be reported as 260 F/g.

Prior Art Example 3

Dependence of Vanadium Oxide Weight Fraction

Figure 5:
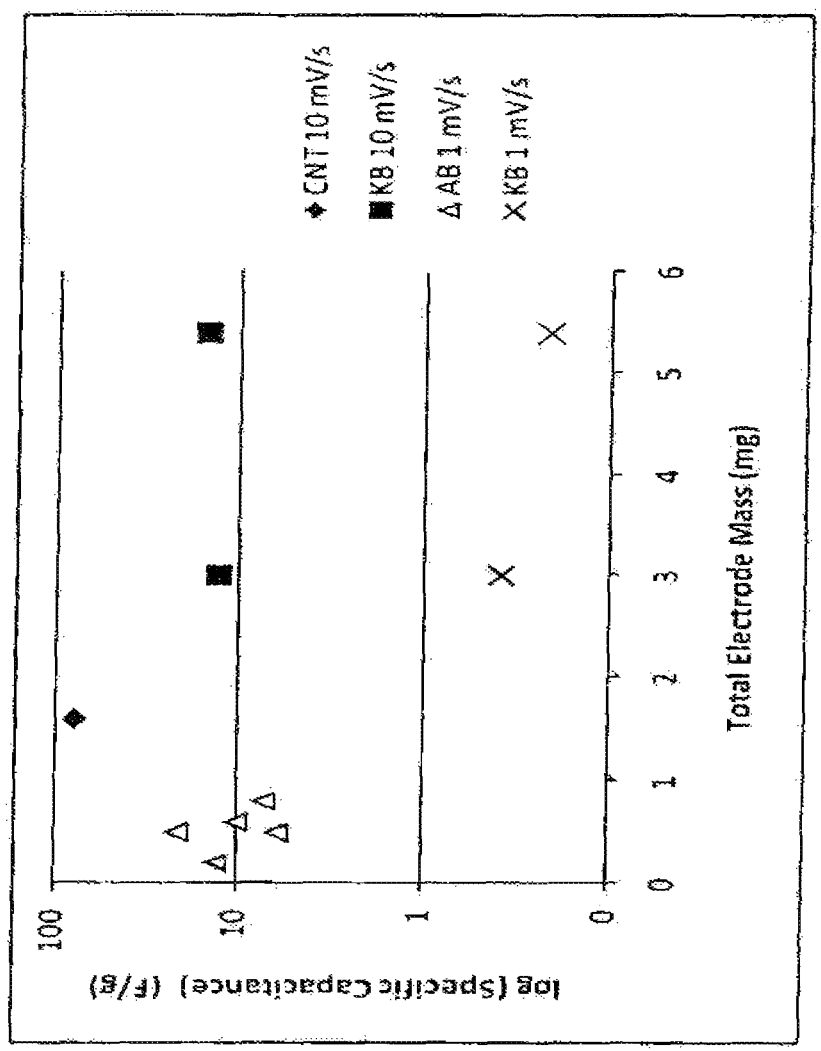
FIG. 5 illustrates specific capacitance of vanadium oxide electrodes for various carbon media.

We demonstrate the relation between specific capacitance and conductive media for vanadium oxide. Electrodes were fabricated using vanadium oxide synthesized with the xerogel procedure, using the standard electrode fabrication procedures described previously. The nominal electrode composition is 70% oxide, 25% conductive media, and 5% binder. The specific capacitance of vanadium oxide electrodes with different types of conductive media (Ketjen black, acetylene black, CNT) is shown in FIG. 5. The specific capacitance data, which was taken for a range of electrode masses, and at various voltage scan rates, indicates there is no order-of-magnitude difference between the conductive materials.

Comparative Example 4

Effect of Electrode Mass and Oxide Composition for Aqueous Electrolytes

Figure 6:
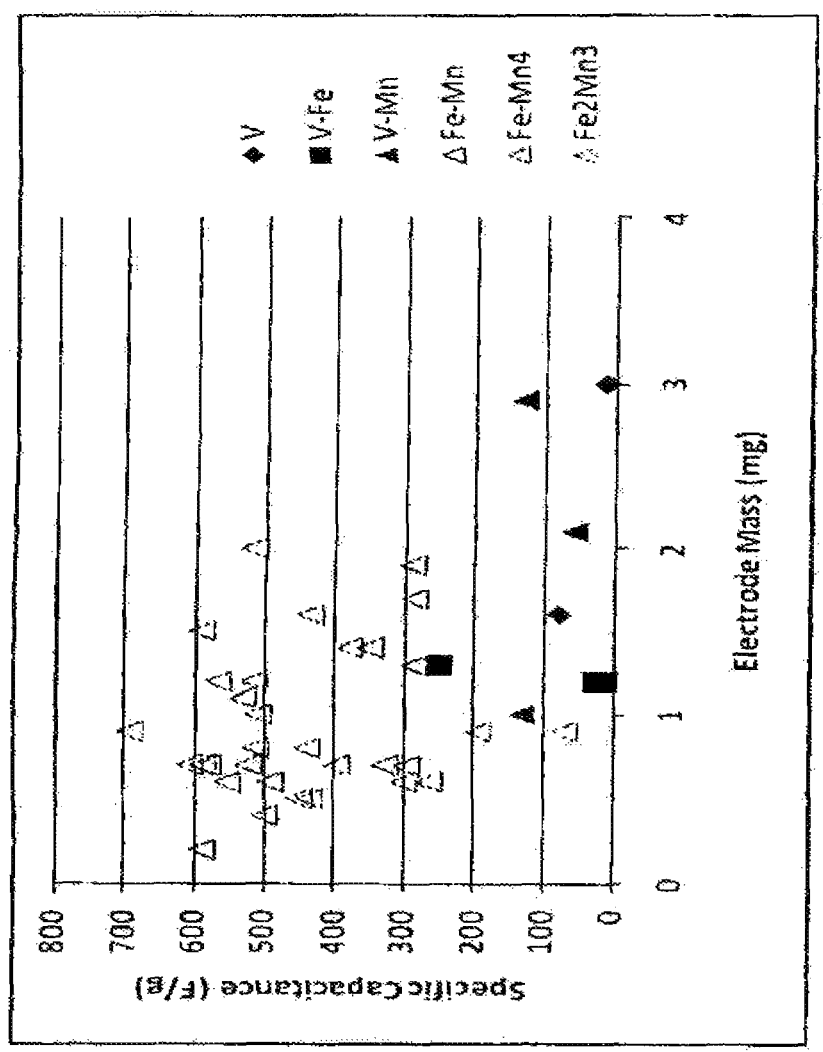
FIG. 6 shows the specific capacitance as a function of electrode mass for various oxides.

We demonstrate the relation between specific capacitance and electrode mass for several materials of this invention and of the prior art. Multiple electrodes were fabricated using oxides synthesized with the xerogel procedure, using the standard electrode fabrication procedures described previously. The nominal electrode composition is 70% oxide, 25% AB or KB, and 5% binder. All data is taken at a scan rate of 1.0 mV/sec in 1M KOH. FIG. 6 shows the effect of metal oxide composition and electrode mass on the specific capacitance. The electrodes fabricated from the iron-manganese mixed metal oxides have larger specific capacitance than the vanadium oxide-based electrodes. Note that the specific capacitance calculation is based on total electrode mass including the carbon and the binder.

Figure 7:
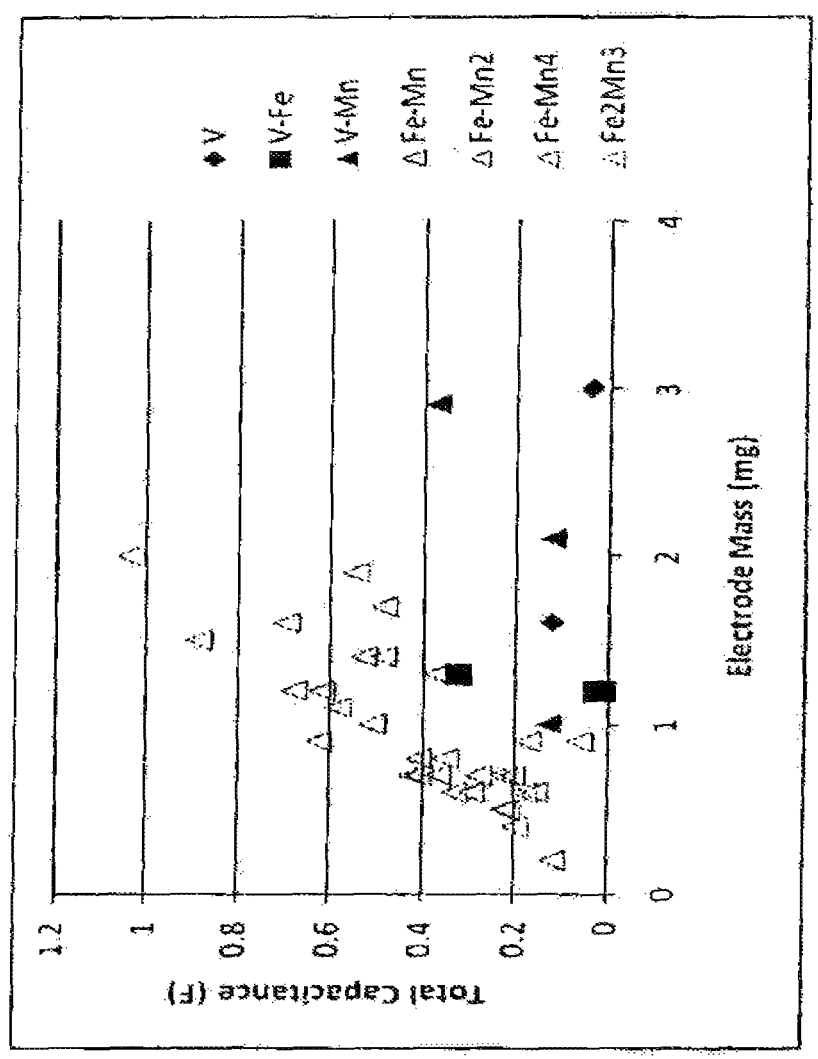
FIG. 7 shows the total capacitance as a function of electrode mass for various oxides.

FIG. 7 shows the total electrode capacitance as a function of electrode mass for the electrodes presented in FIG. 6. In contrast to the specific capacitance which increases with decreasing electrode mass, the total capacitance appears to have a maximum that occurs for electrodes with mass in the range of 1 to 2 mg. This is consistent with the rapid decrease in specific capacitance with electrode mass as shown in FIG. 6.

Comparative Example 5

Effect of Electrode Mass and Oxide Composition for Aqueous Electrolytes

Figure 8:
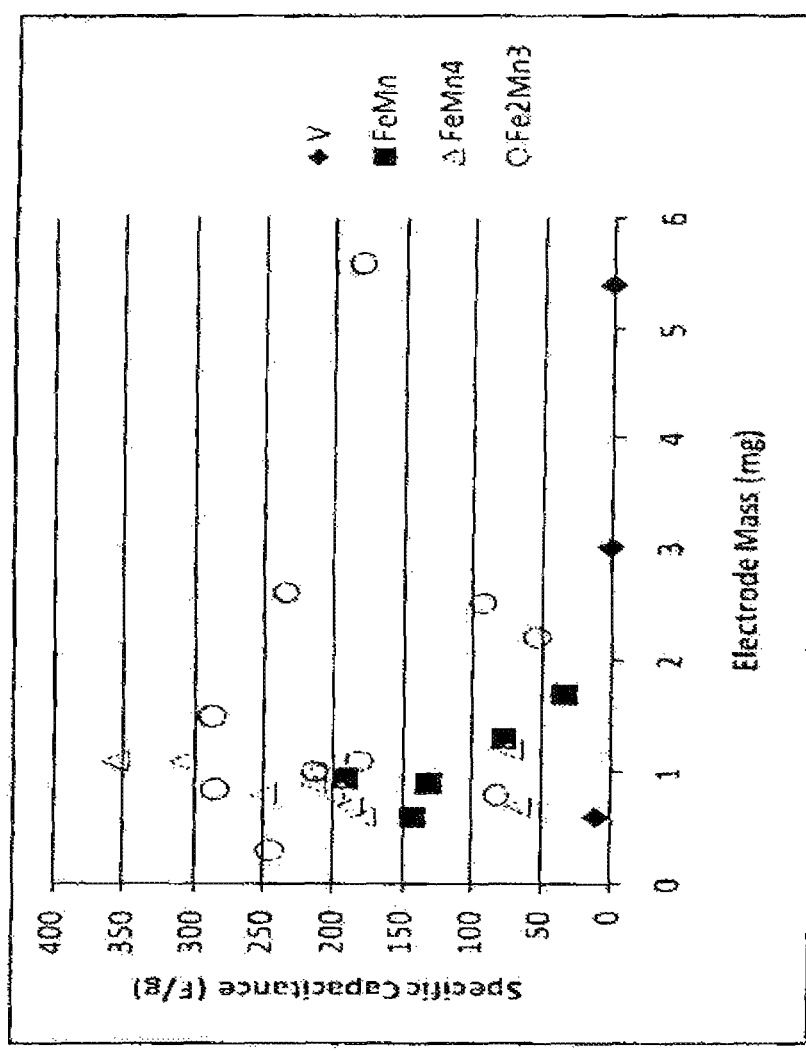
FIG. 8 shows the specific capacitance as a function of electrode mass for various oxides, obtained at a fast scan rate.

We demonstrate the relation between specific capacitance and electrode mass for several materials of this invention and of the prior art. Multiple electrodes were fabricated using oxides synthesized with the xerogel procedure, using the standard electrode fabrication procedures described previously. The nominal electrode composition is 70% oxide, 25% AB or KB, and 5% binder. All data is taken at a scan rate of 10 mV/sec in 1M KOH. FIG. 8 shows the effect of metal oxide composition on specific capacitance. The electrodes fabricated from the iron-manganese mixed metal oxides have larger specific capacitance than the vanadium oxide-based electrodes. Note that the specific capacitance calculation is based on total electrode mass including the carbon and the binder.

Example 6

Figure 9:
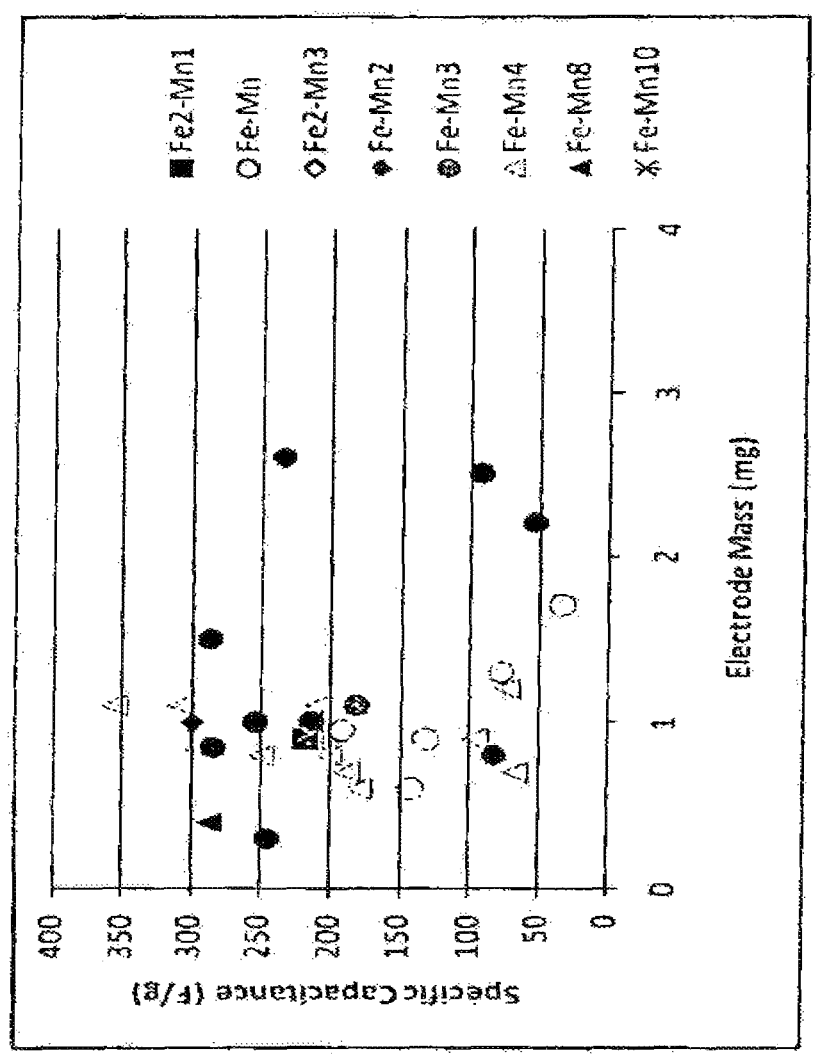
FIG. 9 shows the specific capacitance as a function of electrode mass for various ratios of Fe:Mn obtained at 10 mV/s in 1M KOH aqueous electrolyte.
Figure 10:
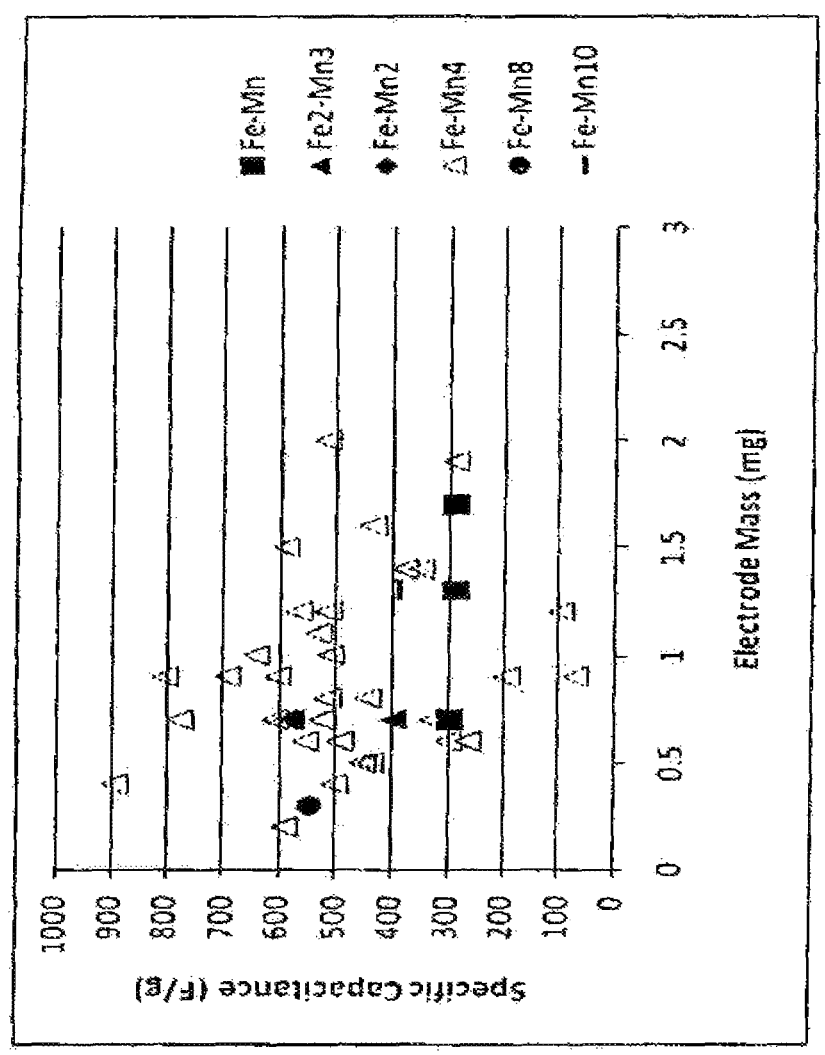
FIG. 10 shows the specific capacitance as a function of electrode mass for various ratios of Fe:Mn obtained at 1 mV/s in 1M KOH aqueous electrolyte.

Effect of Electrode Mass and Oxide Composition for Fe—Mn Mixed Metal Oxides in Aqueous Electrolytes We demonstrate the relation between specific capacitance and electrode mass for several iron-manganese mixed metal oxide compositions. Multiple electrodes were fabricated using oxides synthesized with the xerogel procedure, using the standard electrode fabrication procedures described previously. The nominal electrode composition is 70% oxide, 25% AB, and 5% binder. All measurements were performed using 1M KOH as the electrolyte. The capacitance as a function of electrode mass measured at 10 mV/s is given in FIG. 9. The capacitance as a function of electrode mass measured at 1 mV/s is given in FIG. 10.

Example 7

Figure 11:
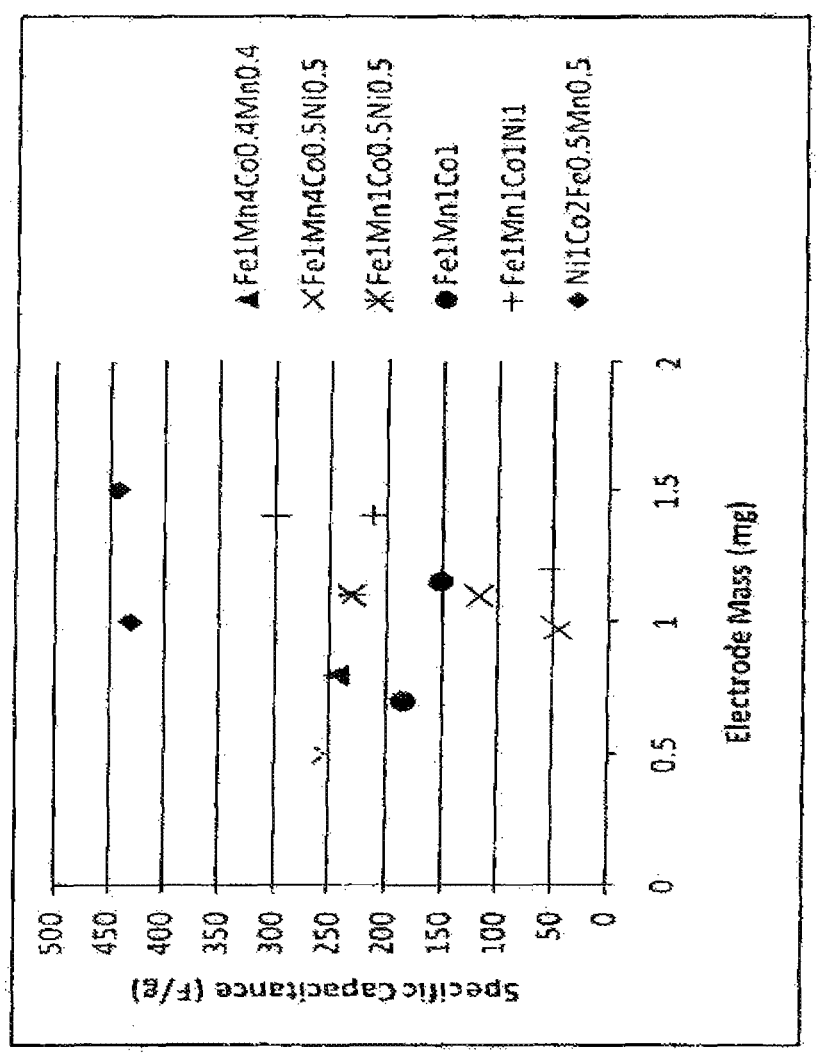
FIG. 11 shows the specific capacitance as a function of electrode mass for various oxides, obtained at 10 mV/s.
Figure 12:
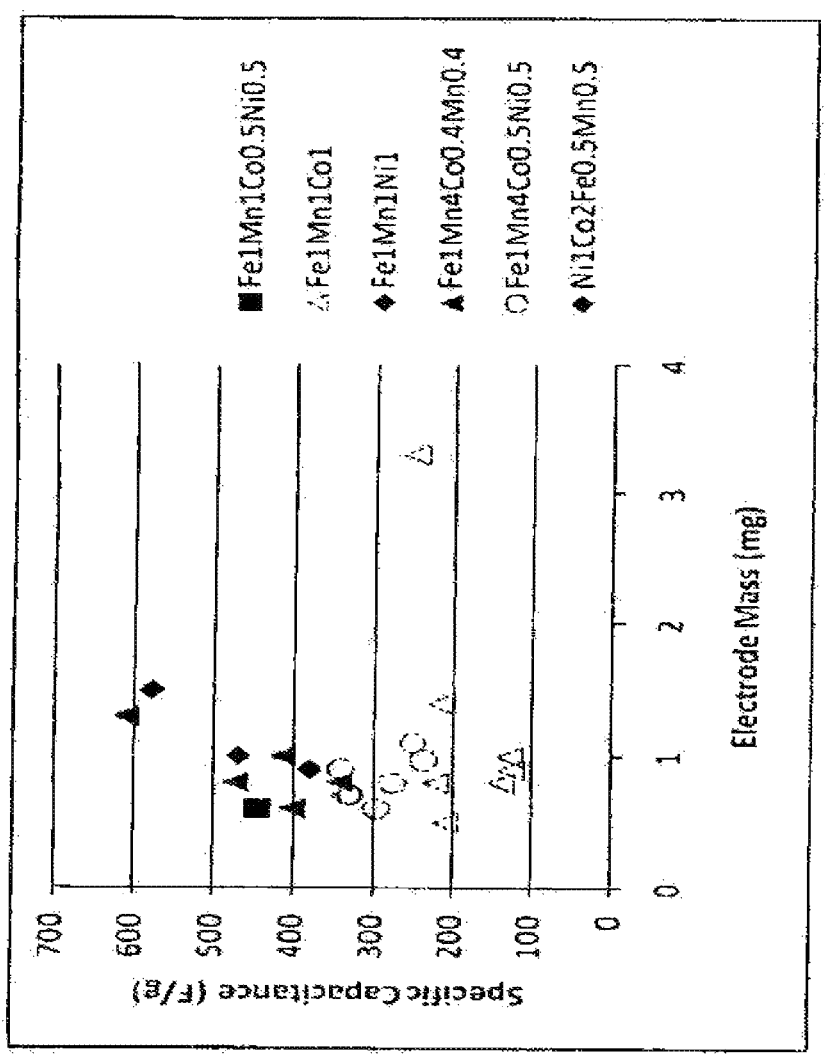
FIGS. 12-15 show the specific capacitance as a function of electrode mass for various oxides, obtained at 1 mV/s.

Effect of Electrode Mass and Oxide Composition for Fe—Mn—Ni—Co Mixed Metal Oxides in Aqueous Electrolytes We examined the relation between specific capacitance and electrode mass for several iron-manganese oxides. Electrodes were fabricated using oxides synthesized with the xerogel procedure, using the standard electrode fabrication procedures described previously The nominal electrode composition is 70% oxide, 25% AB, and 5% binder. All measurements were performed using 1M KOH as the electrolyte. The capacitance as a function of electrode mass measured at 10 mV/s is given in FIG. 11. The capacitance as a function of electrode mass measured at 1 mV/s is given in FIG. 12.

Example 8

Figure 13:
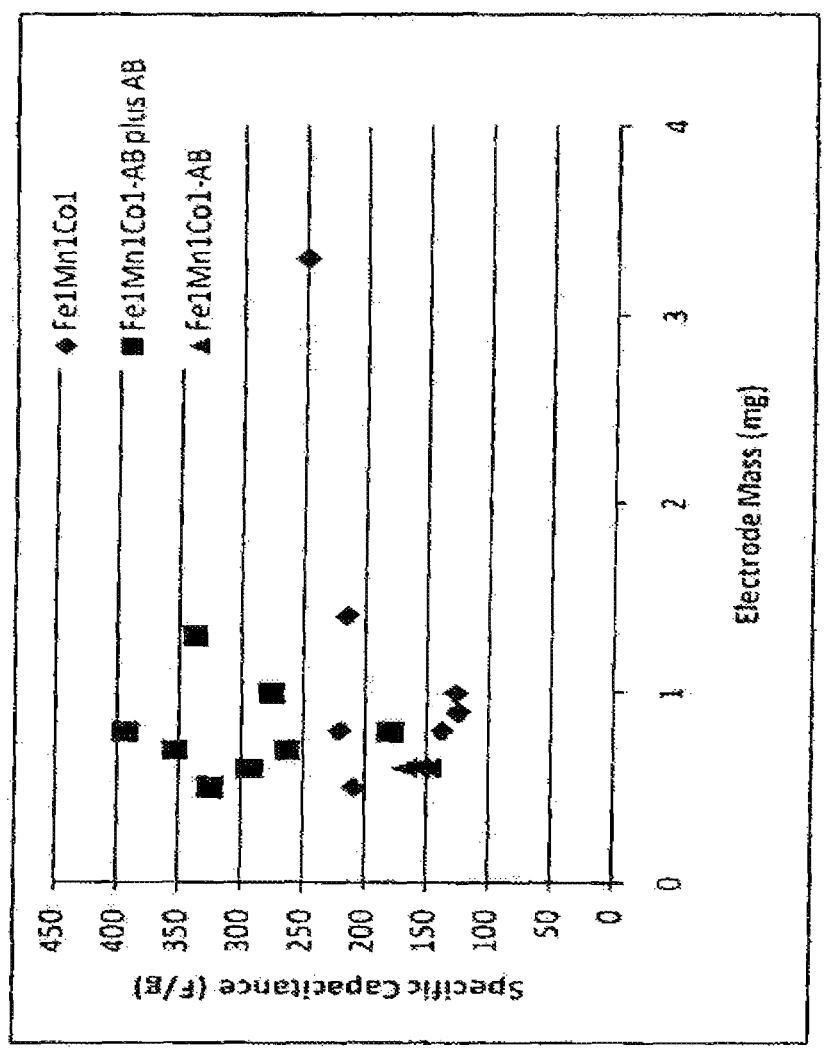

Effect of "In-Situ" Oxide Synthesis of Fe—Mn—Co Measured in Aqueous Electrolytes A mixed oxide of formula FeMnCo was synthesized using the methods described previously. Multiple electrodes were fabricated from this oxide using the method described previously, with a composition of 70% oxide, 25% acetylene black, and 5% binder. An "in-situ" synthesis of FeMnCo was performed in the presence of carbon black, with a nominal ratio of oxide to carbon black the same as the previous electrode. This material was combined with 5% binder to form a second set electrode of electrodes. A third set of electrodes was formed by combining 70 wt % of the "in-situ" synthesized FeMnCo with 25 wt % AB and 5 wt % binder. The capacitance was measured at 1 mV/s in 1M KOH. FIG. 13 presents the measured specific capacitance as a function of electrode mass for all three types of electrode preparation.

Example 9

Effect of "In-Situ" Oxide Synthesis of Fe—Mn4 Measured in Aqueous Electrolytes

Figure 14:
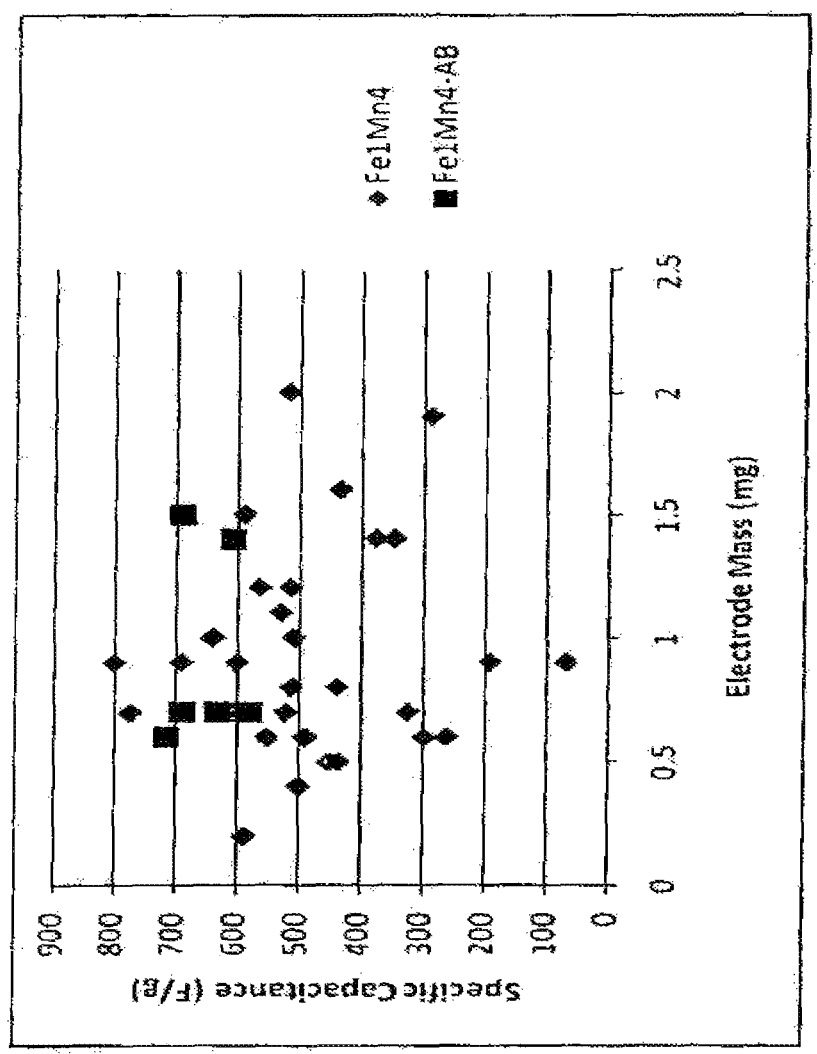

A mixed oxide of formula FeMn4 was synthesized using the methods described previously. Multiple electrodes were fabricated from this oxide using the method described previously, with a composition of 70% oxide, 25% acetylene black, and 5% binder. An "in-situ" synthesis of FeMn4 was performed in the presence of AB, with a nominal ratio of oxide to AB the same as the previous electrode. This material was combined with 5% binder to form a second set electrode of electrodes. A third set of electrodes was formed by combining 70 wt % of the "in-situ" synthesized FeMn4-AB with 25 wt % AB and 5 wt % binder. The capacitance was measured at 1 mV/s in 1M KOH. FIG. 14 presents the measured specific capacitance as a function of electrode mass for all three types of electrode preparation.

Example 10

Effect of "In-Situ" Oxide Synthesis of Fe—Mn4 Measured in Aqueous Electrolytes

Figure 15:
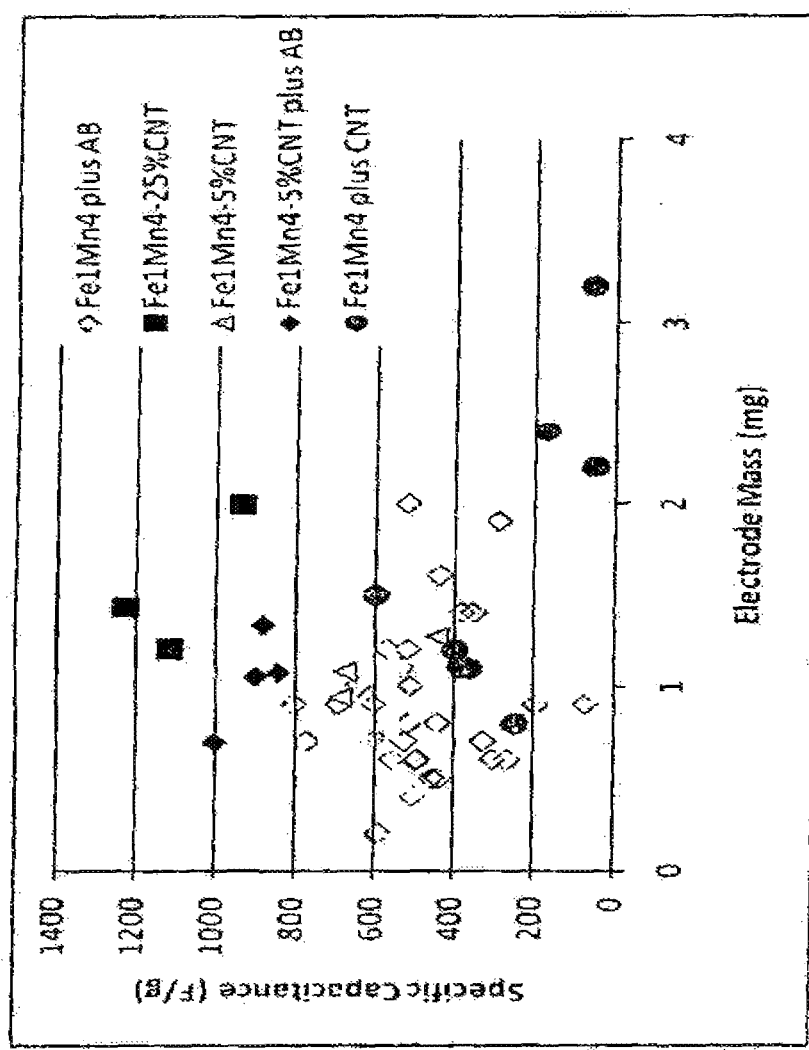

A mixed oxide of formula FeMn4 was synthesized using the methods described previously. Multiple electrodes were fabricated from this oxide using the method described previously, with a composition of 70% oxide, 25% acetylene black, and 5% binder. An "in-situ" synthesis of FeMn4 was performed in the presence of single-wall carbon nanotubes (SWNT), with a nominal ratio of oxide to SWNT the same as the previous electrode. This material was combined with 5% binder to form a second set electrode of electrodes. An "in-situ" synthesis of FeMn4 was performed in the presence of single-wall carbon nanotubes (SWNT), with a nominal ratio of 5 wt % SWNT to oxide. This material was combined with 5% binder to form a third set electrode of electrodes. A fourth set of electrodes was formed by combining 75 wt % of the "in-situ" synthesized FeMn4 with 20 wt % AB and 5 wt % binder. The capacitance was measured at 1 mV/s in 1M KOH. FIG. 15 presents the measured specific capacitance as a function of electrode mass for all three types of electrode preparation.

Example 11

Effect of Heat Treatment of Hydroxide/Oxide for Aqueous Electrolytes

The synthesized materials have a high degree of hydroxide character, due to the synthesis and drying conditions. Heating of these materials is known to convert the hydroxide to oxide. We demonstrate the relative contribution of the hydroxide and oxide in aqueous electrolyte in the following manner. Samples of FeMn4, prepared as described previously, were heat-treated at various temperatures and durations. Electrodes were formed from these oxides using the standard procedure, and standard electrode composition of 70% hydroxide/oxide, 25% AB, and 5% binder. The capacitance was measured at 1 mV/s in 1M KOH, with the following results.

| Heat treatment | Electrode mass (mg) | Specific Capacitance F/g |
|---|---|---|
| 50 C., 1 day | 2 | 517 |
| 100 C. 2 h | 0.9 | 395 |
| 150 C. 2 h | 1.3 | 137 |
| 200 C. 2 h | 1 | 115 |
| 250 C. 2 h | 1.6 | 31 |

X-ray diffraction studies of the hydroxide/oxide materials before and after heat treatment show the heat treatment leads to a decrease in the amount of hydroxide present and an increase in the amount of oxide as the heat treatment temperature is increased.

Comparative Example 12

Effect of Scan Rate for Aqueous Electrolyte

Figure 16:
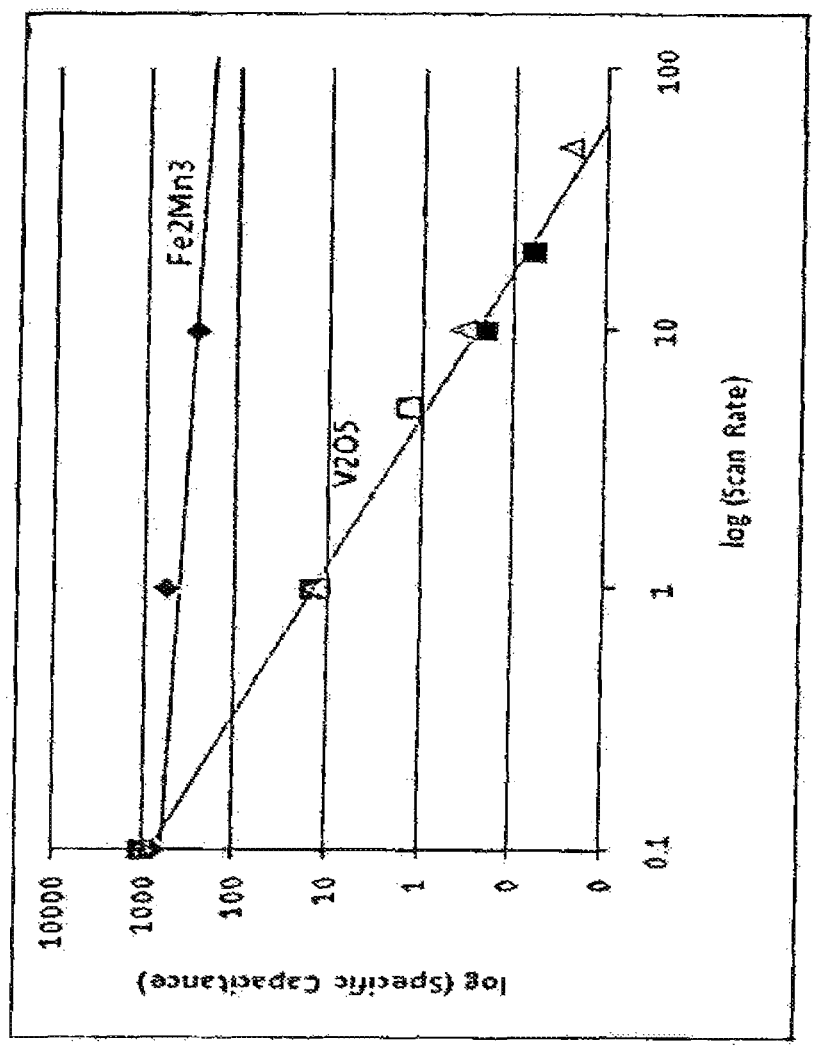
FIG. 16 shows a log plot of specific capacitance as a function of voltage scan rate.

We demonstrated the relation between specific capacitance and scan rate for Fe2Mn3. An electrode was fabricated using Fe2Mn3 synthesized with the xerogel procedure, using the standard electrode fabrication procedures described previously. The nominal electrode composition is 70% oxide, 25% AB, and 5% binder. FIG. 16 shows the specific capacitance as a function of voltage scan rate for this electrode. For comparison, the data previously shown in FIG. 2 is also included. The vanadium oxide shows a very large dependence on the voltage scan rate, while the Fe2Mn3 electrode demonstrates much less sensitivity to voltage scan rate.

Example 13

Effect of Scan Rate in Aqueous Electrolyte

Figure 17:
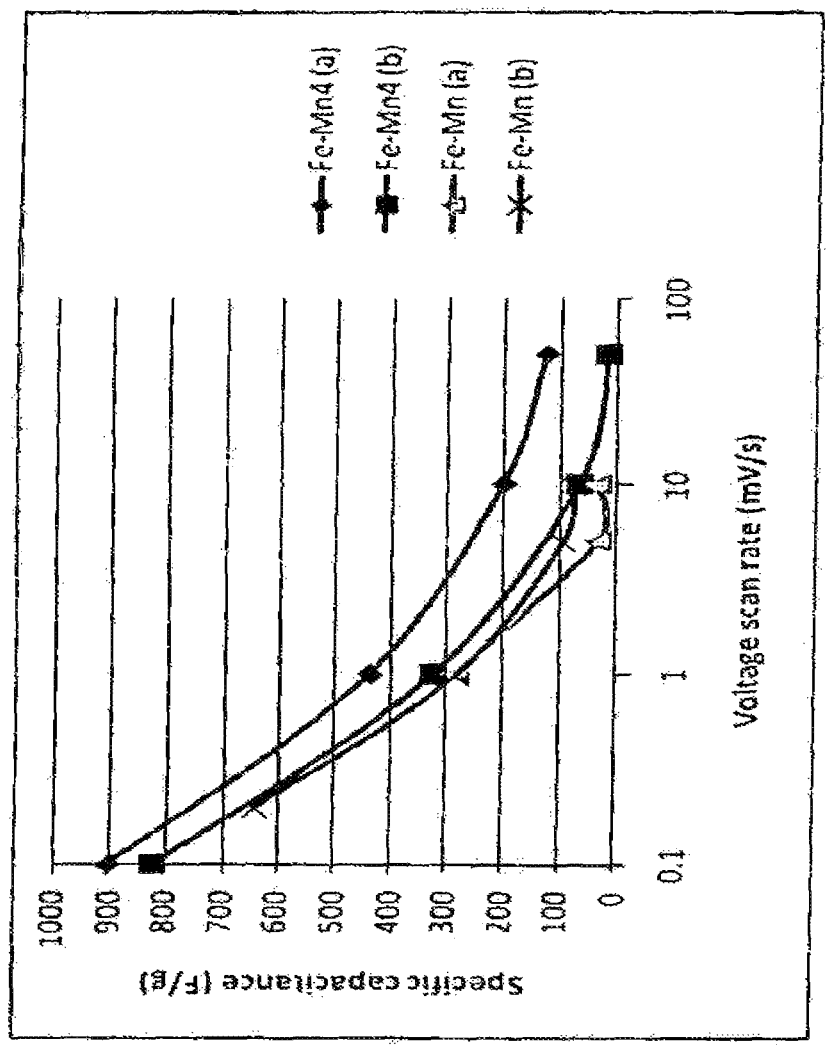
FIG. 17 is a plot of specific capacitance as a function of voltage scan rate for $FeMn_4$ oxide in 1M KOH aqueous electrolyte.

We demonstrate the relation between specific capacitance and scan rate for FeMn and FeMn4. Four electrodes were fabricated using FeMn or FeMn4 synthesized by the standard xerogel process, using the standard electrode fabrication procedures described previously. The nominal electrode composition is 70% oxide, 25% AB, and 5% binder. FIG. 17 presents the specific capacitance for FeMn and FeMn4 as a function of voltage scan rate. To ensure there are no artifacts due to the repeated testing of single electrodes, the $FeMn_4$ (a) sample was measured from fastest voltage scan rate to slowest, while the $FeMn_4$ (b) sample was measured starting at the slowest voltage scan rate. Each of the four electrodes was used in measurements at two or more scan rates. Each electrode exhibits the rapid increase in specific capacitance with decreasing voltage scan rate.

Example 14

Effect of Scan Rate for FeMn4 in Aqueous Electrolyte

Figure 18:
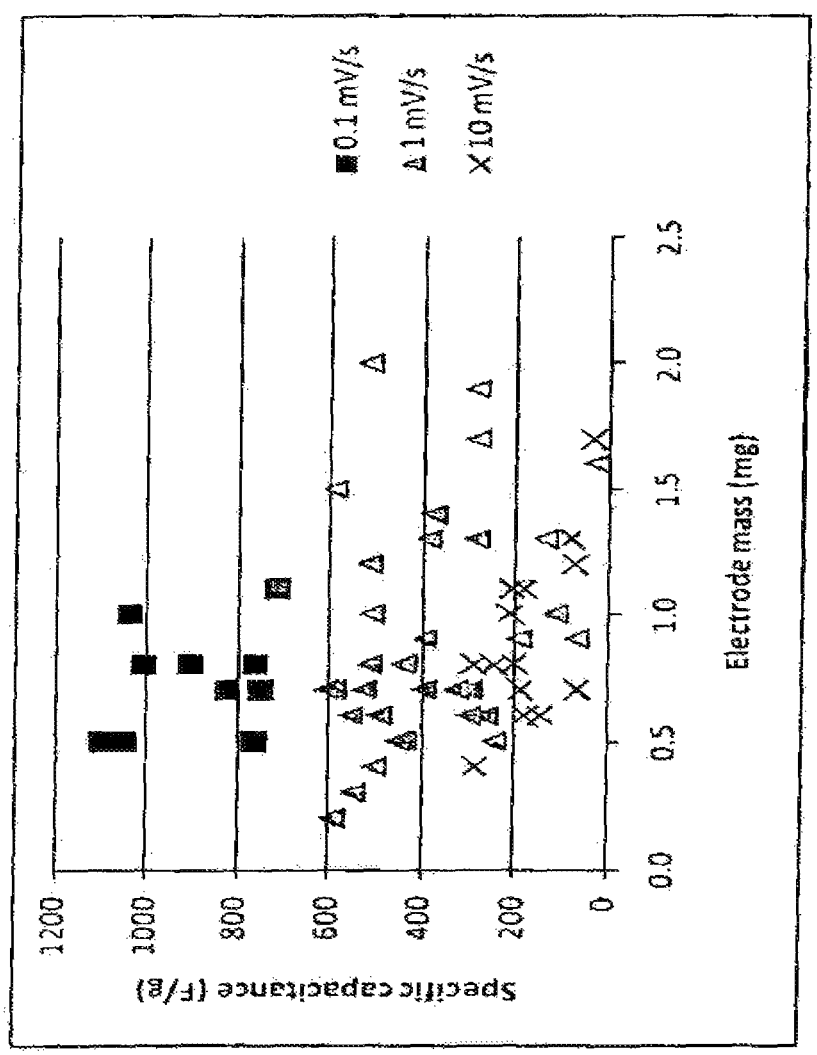
FIG. 18 is a plot of specific capacitance as a function electrode mass for $FeMn_4$ oxide in 1M KOH aqueous electrolyte measured at three different voltage scan rates.

We demonstrate the relation between specific capacitance and voltage scan rate for FeMn4. Multiple electrodes were fabricated using FeMn4 synthesized with the xerogel procedure, using the standard electrode fabrication procedures described previously. The nominal electrode composition is 70% oxide, 25% AB, and 5% binder. FIG. 18 shows the specific capacitance for the electrodes. Measurements were taken in 1M KOH.

Example 15

Effect of Conductive Media Weight Fraction in Aqueous Electrolytes

Figure 19:
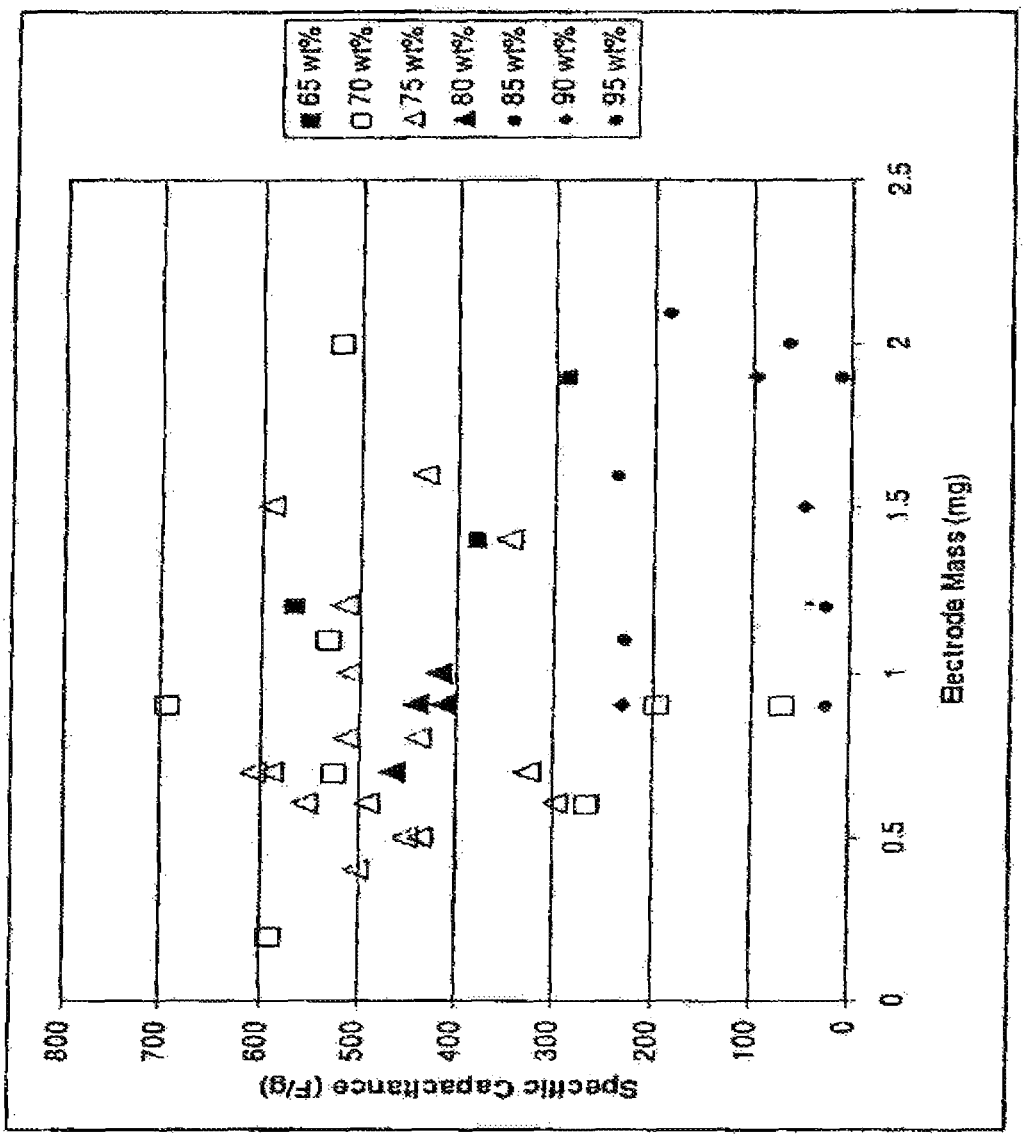
FIG. 19 is a plot of specific capacitance as a function electrode mass for $FeMn_4$ oxide with varying amounts of carbon, obtained at 1 mV/s in 1M KOH aqueous electrolyte.

We examined the relation between specific capacitance and AB weight fraction for FeMn4. Multiple electrodes were fabricated using FeMn4 synthesized by the xerogel procedure, using the standard electrode fabrication procedures described previously. The oxide content was varied from 65 wt % to 95 wt % with 5 wt % binder. FIG. 19 shows the specific capacitance as a function of electrode mass for FeMn4 with measured at 1 mV/s in 1M KOH.

Example 16

Effect of Binder for Aqueous Electrolytes

Figure 20:
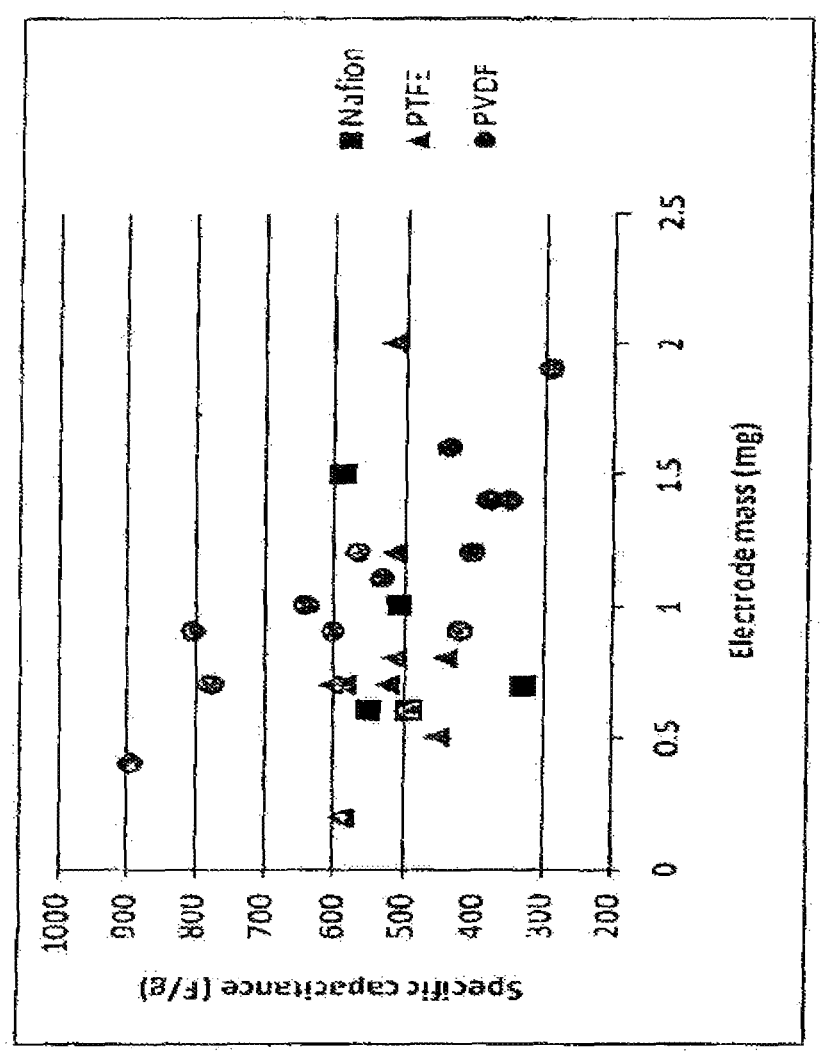
FIG. 20 is a plot of specific capacitance as a function electrode mass for $FeMn_4$ oxide with different binders, obtained at 1 mV/s in 1M KOH aqueous electrolyte.

We demonstrate the relation between specific capacitance and binder polymer for FeMn4. Multiple electrodes were fabricated using FeMn4 synthesized by the xerogel procedure, using the standard electrode fabrication procedures described previously. The nominal electrode composition is 70% oxide, 25% AB, and 5% binder. FIG. 20 shows the specific capacitance as a function of binder, for FeMn4, measured at 1 mV/s in 1M KOH. Additional electrodes were fabricated using an epoxy as the binder or using a silane sol-gel as the binder. The capacitance for both binders was too small to fit on the scale of FIG. 20.

Example 17

Effect of Active Species and Molarity, for FeMn4 in Aqueous Electrolytes

Figure 21:
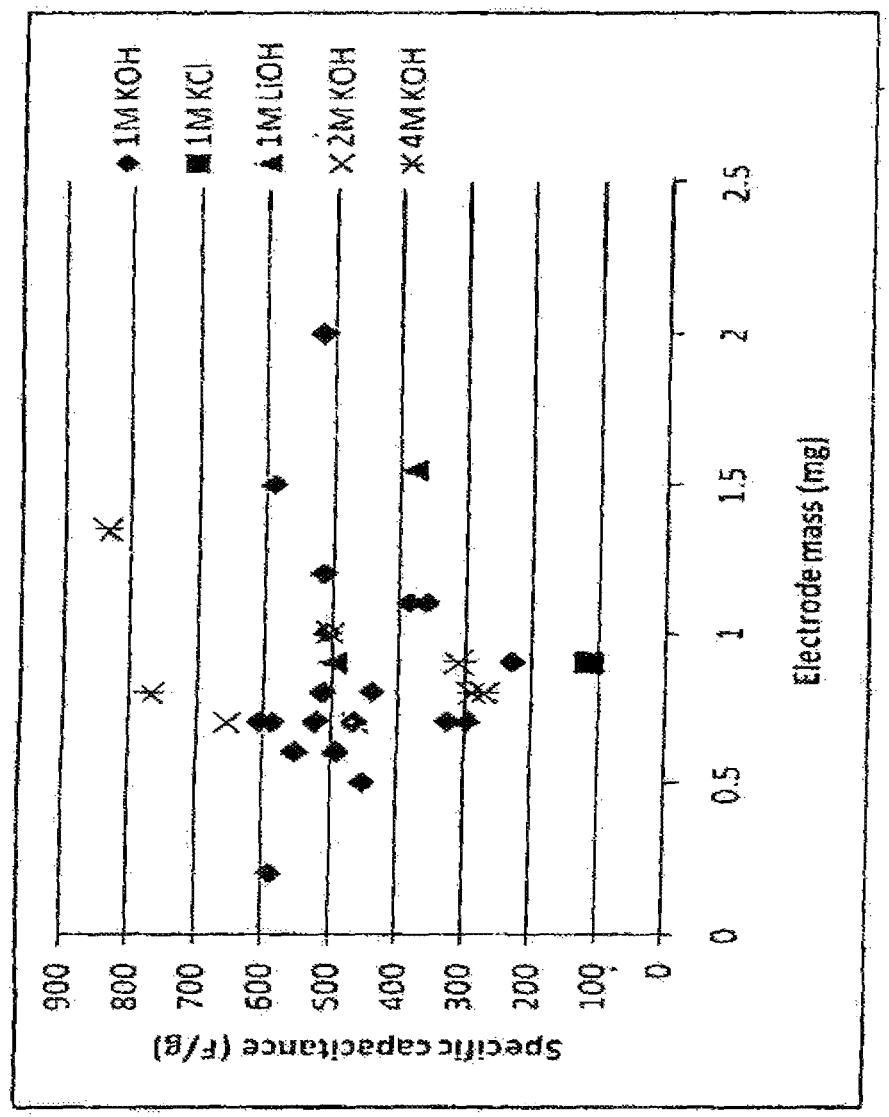
FIG. 21 is a plot of specific capacitance as a function electrode mass for $FeMn_4$ oxide, obtained at 1 mV/s in various aqueous electrolytes.

We demonstrate the relation between specific capacitance and KOH molarity for FeMn4. Multiple electrodes were fabricated using FeMn4 synthesized by the xerogel procedure, using the standard electrode fabrication procedures described previously. The nominal electrode composition is 70% oxide, 25% AB, and 5% binder. Testing has been performed in 1M, 2M and 4M KOH, as shown in FIG. 21. Capacitance measurements have also been performed using 1M LiOH and 1M KCl, as shown in FIG. 21. The low capacitance for KCl suggests the hydroxyl is the active species.

Example 18

Figure 22:
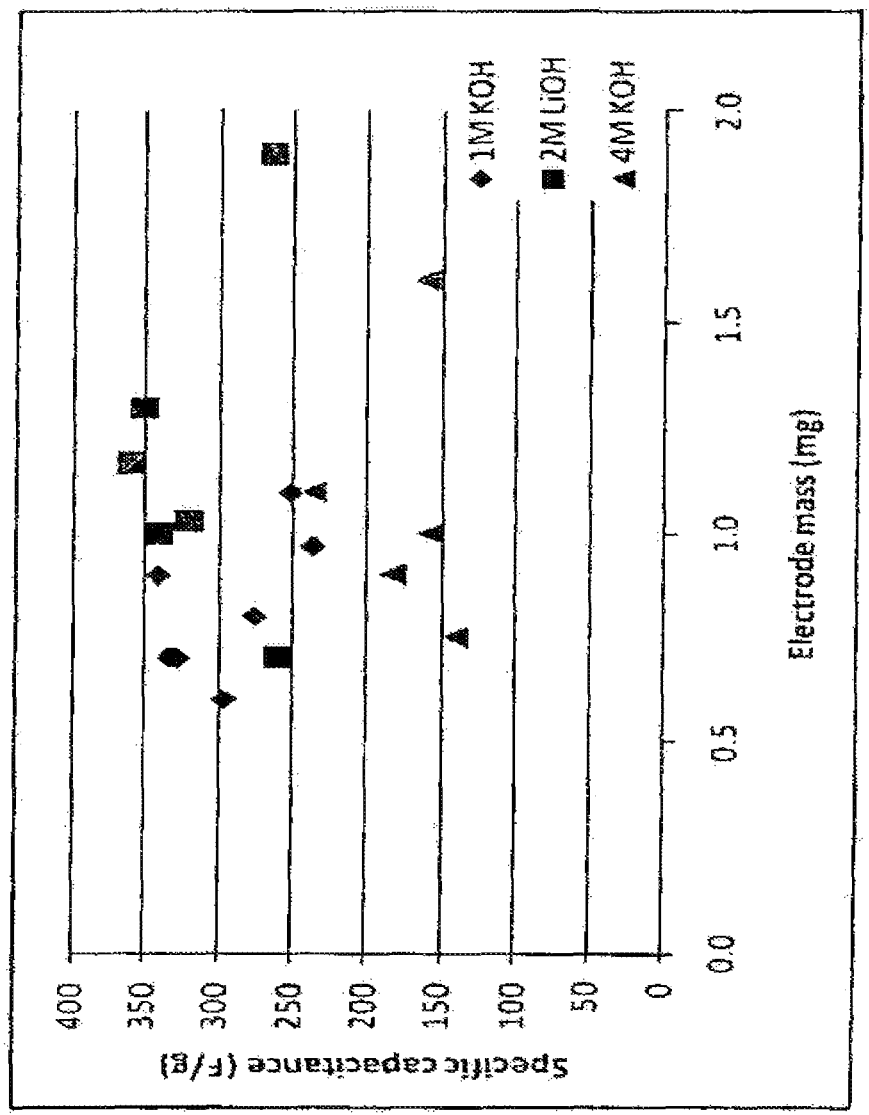
FIG. 22 a plot of specific capacitance as a function electrode mass for $FeMn_4Ni_{0.5}Co_{0.5}$ oxide, obtained at 1 mV/s.

Effect of Active Species and Molarity, for $Fe_1Mn_4Ni_{0.5}Co_{0.5}$ in Aqueous Electrolytes We demonstrate the relation between specific capacitance and KOH molarity for $Fe_1Mn_4Ni_{0.5}Co_{0.5}$ oxides. Multiple electrodes were fabricated using $Fe_1Mn_4Ni_{0.5}Co_{0.5}$ oxides synthesized by the xerogel procedure, using the standard electrode fabrication procedures described previously. The nominal electrode composition is 70% oxide, 25% AB, and 5% binder. FIG. 22 presents the capacitance measured at 1 mV/s. Measurement performed using 1M LiOH as the electrolyte gave specific capacitance slightly less than would be expected in 1M KOH.

Example 19

Effect of Additional Salts on FeMn4 in Aqueous Electrolytes

We measured the specific capacitance of FeMn4 in 1M KOH with additional salts. Electrodes were fabricated using FeMn4 synthesized by the xerogel procedure, using the standard electrode fabrication procedures described previously. The nominal electrode composition was 70% oxide, 25% AB, and 5% binder. Measurements were performed using 1M KOH in conjunction with different salts. At 10 mV/s, 1M KOH with 1M NaHSO3 the capacitance was diminished, but was reasonably stable for 100 voltage cycles. 1M KOH with 1M NaSCN was not stable under cycling, neither was 1M KOH with 1M K2CO3.

Example 20

Effect of Electrode Mass and Oxide Composition for Nickel-Cobalt Mixed Metal Oxides in Aqueous Electrolytes We demonstrateD the relation between specific capacitance and electrode mass for several nickel-cobalt oxides of varying composition. Electrodes were fabricated using oxides synthesized with the xerogel procedure, using the standard electrode fabrication procedures described previously. The nominal electrode composition is 70% oxide, 25% AB, and 5% binder. All data is taken in at 10 mV/s in 1M KOH. The specific capacitance measured on the fifth voltage cycle is given in below.

|  | Specific Capacitance (F/g) | Electrode mass (mg) |
| --- | --- | --- |
| Ni | 367 | 1.1 |
| Ni4Co | 541 | 0.9 |
| Ni2Co | 614 | 0.7 |
| NiCo | 674 | 0.9 |
| NiCo2 | 56 | 1.6 |
| NiCo3 | 36 | 1.6 |

Example 21

Effect of Electrode Mass and Oxide Composition for Nickel-Cobalt Mixed Metal Oxides in Aqueous Electrolytes We demonstrate the relation between specific capacitance and oxide composition for several nickel-cobalt oxides doped with various amounts of iron and/or manganese. Electrodes were fabricated using oxides synthesized with the xerogel procedure, using the standard electrode fabrication procedures described previously. The nominal electrode composition is 70% oxide, 25% AB, and 5% binder. Data was taken at 10 mV/s and 1 mV/s in 1M KOH.

NiFe and NiMn were both synthesized as described previously, and electrodes were fabricated. For both electrodes, the capacitance was not stable, decreasing rapidly with cycling.

Electrodes were fabricated using the following oxides, $NiCo_2Fe_{0.1}$, $NiCo_2Fe_{0.5}$, $Ni_1Co_2Fe_{10}$, $Ni_1Co_2Fe1.0Mn_{0.5}$, $Ni_1Co_2Fe_{0.5}Mn_{0.5}$. The nominal electrode composition is 70% oxide, 25% AB, and 5% binder. Data was taken at 10 mV/s and 1 mV/s in 1M KOH. The electrodes underwent voltage cycling until the capacitance appeared steady from one cycle to the next. All electrodes had large capacitance at both voltage scan rates. $Ni_1Co_2Fe_{1.0}Mn_{0.5}$ had the largest specific capacitance at both scan rates Example 22

Figure 23:
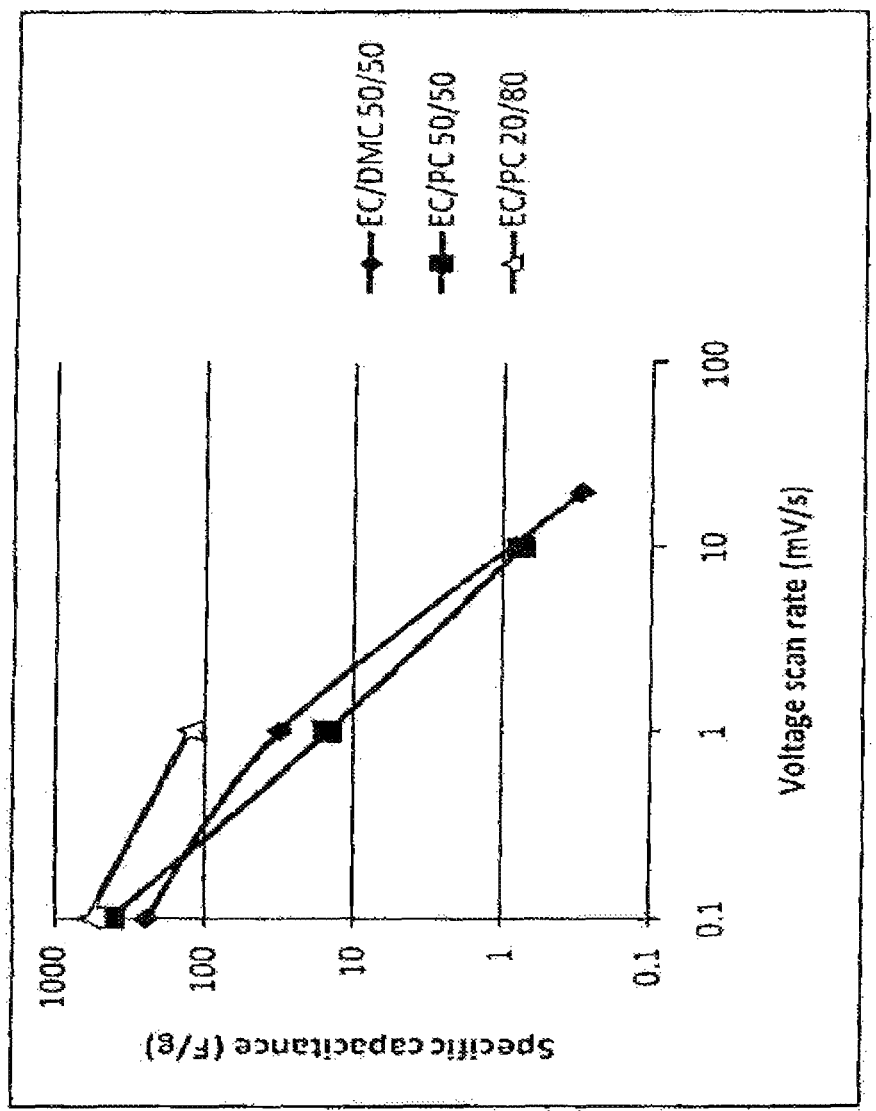
FIG. 23 illustrates scan rate dependence for various non-aqueous electrolytes.

Effect of Electrode Mass and Oxide Composition for FeMn4 Mixed Metal Oxides in Non-Aqueous Electrolytes We demonstrate the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with three different electrolytes (FIG. 23) at various scan rates. LiPF6 was the salt used in all the measurements. The straight lines on the Figure are given to indicate the rate of change of capacitance with voltage scan rate. Visual examination of the system during testing revealed no indication of the formation of hydrogen gas, as would be evidenced by bubbling. The electrode was cycled repeatedly and was very stable at 1.8V. Measurements were also performed using electrodes fabricated from the heat-treated samples of Example 11. There was little difference in measured specific capacitance for the heat-treated samples, as opposed to the case in aqueous electrolytes.

Example 23

Figure 24:
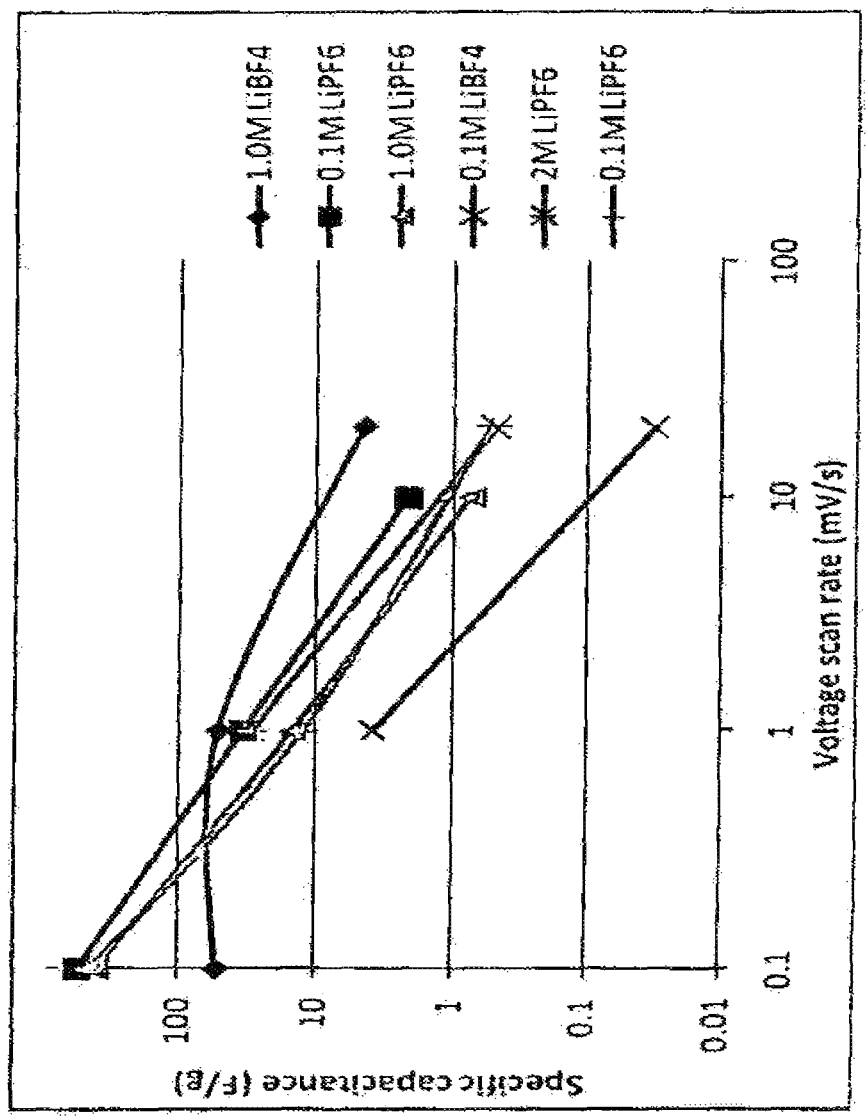
FIG. 24 shows specific capacitance of $FeMn_4$ oxide in a 50/50 volume mixture of ethylene carbonate and propylene carbonate (EC/PC).

Effect of Electrode Mass and Oxide Composition for FeMn4 Mixed Metal Oxides in Non-Aqueous Electrolytes We measured the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (50/50) as the solvent, using LiPF6 and LiBF4 at various molarities. The testing has been performed at several different scan rates. The results are shown in FIG. 24. The capacitance of these samples appears to be stable under cycling, with 100 cycles or more showing no change in capacitance.

Example 24

Figure 25:
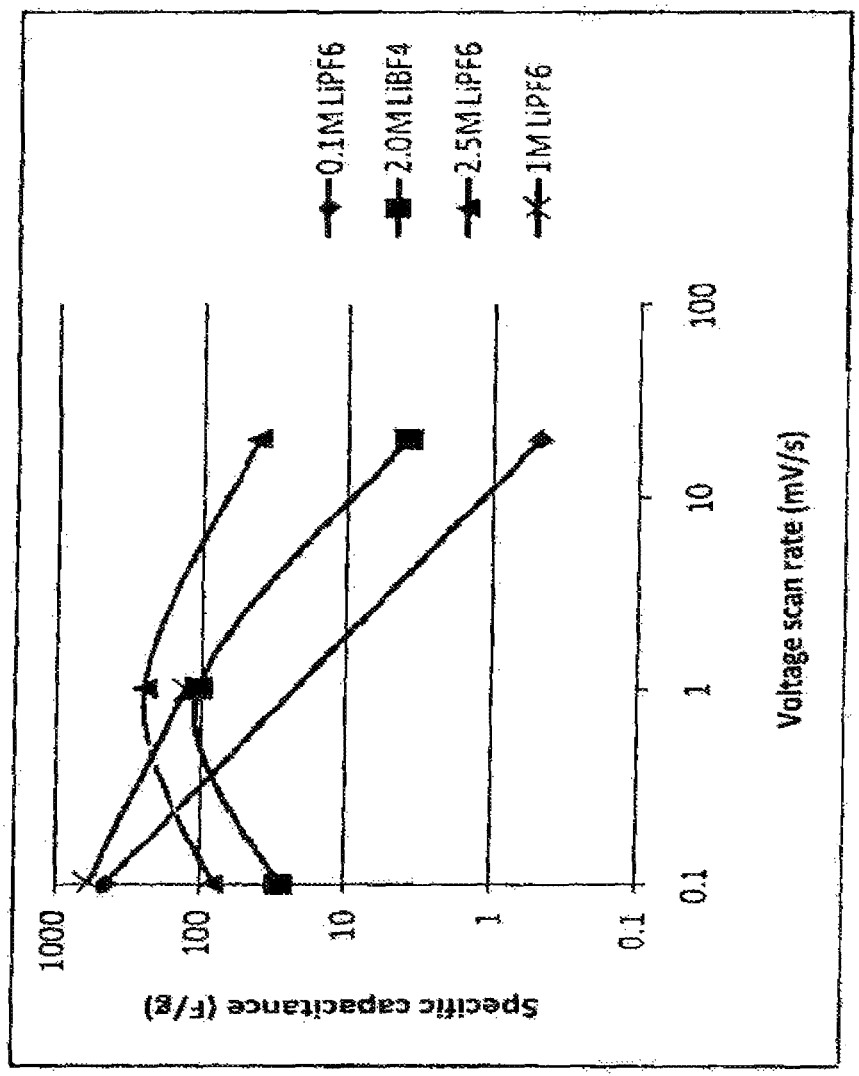
FIG. 25 shows specific capacitance of $FeMn_4$ oxide in 20/80 EC/PC.

Effect of Electrode Mass and Oxide Composition for FeMn4 Mixed Metal Oxides in Non-Aqueous Electrolytes We measured the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (20/80) as the solvent, using LiPF6 and LiBF4 at various molarities. The testing has been performed at several different scan rates. The results are shown in FIG. 25. The capacitance of these samples appears to be stable under cycling, with 100 cycles or more showing no change in capacitance.

Example 25

Figure 26:
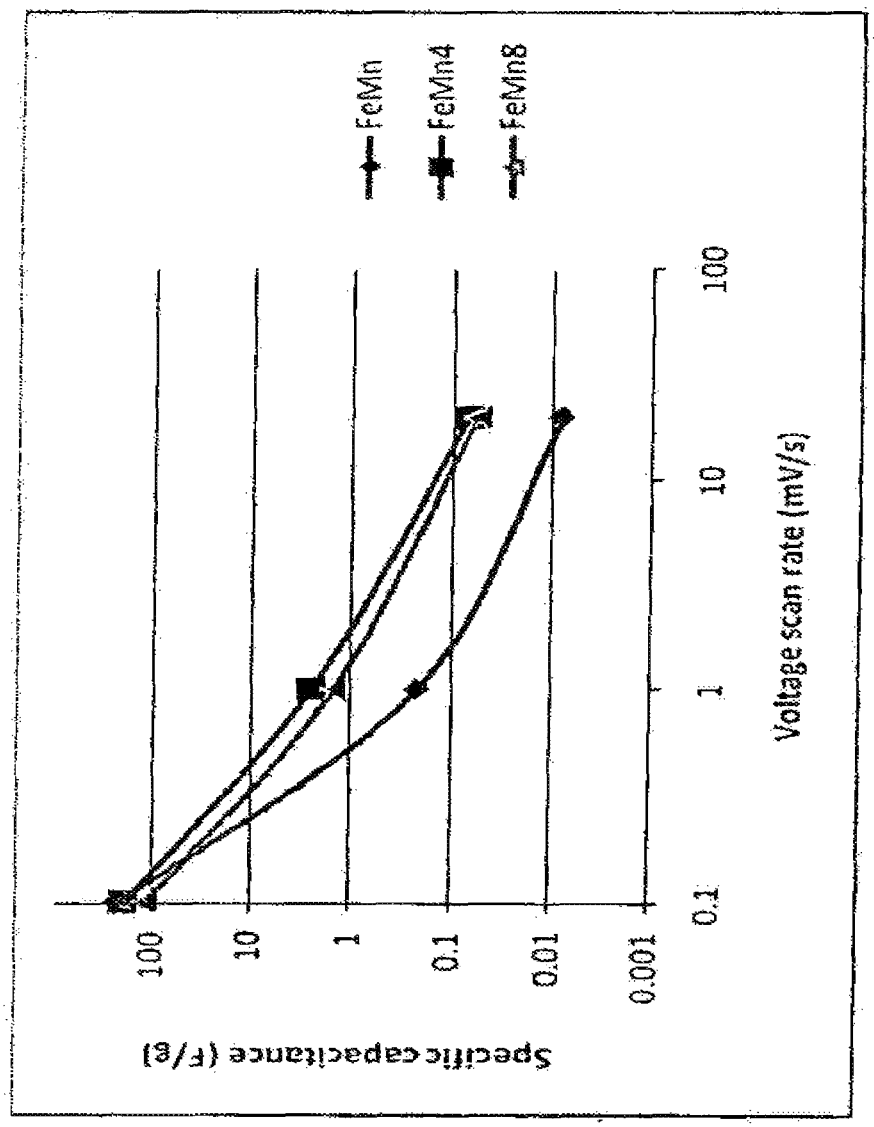
FIG. 26 shows specific capacitance of FeMn, $FeMn_4$, and $FeMn_8$ oxides in 80/20 EC/PC.

Effect of Electrode Mass and Oxide Composition for FeMn4 Mixed Metal Oxides in Non-Aqueous Electrolytes We measured the specific capacitance of FeMn, FeMn4, and FeMn8 in 1M $LiBF_4$ in EC/PC (80/20). Electrodes were fabricated using FeMn, FeMn4, and FeMn8 synthesized by the xerogel procedure, using the standard electrode fabrication procedures described previously. The nominal electrode composition was 70% oxide, 25% AB, and 5% binder. Testing was performed at various voltage scan rates. The measured specific capacitance as a function of voltage scan rate is given in FIG. 26, for FeMn1, FeMn4, and FeMn8.

Example 26

Interfacial Stability Testing in Aqueous Electrolyte

We have performed initial examination of the interface (surface-electrolyte) stability of the capacitance response in aqueous electrolytes. Initial measurements were performed using $FeMn_4$ in 1M KOH. Measurements showed the capacitance decreased under repeated cycling, losing up to 80% of the capacitance over 25 cycles. Similar behavior is observed in the $Fe_xMn_yNi_8Co_o$ electrodes, although the rate of change in the capacitance may be slower. There are several possible reasons for this decrease in capacitance, including the physical loss of the hydroxide/oxide from the electrode due to stress and the conversion of the hydroxide/oxide to more crystalline oxide. We have performed a series of experiments to explore the origins of this behavior and identify ways to mitigate it moving forward. The results can be summarized in the following points.
1. Measurement of the capacitance under limited cycling conditions was performed using constant current and constant voltage scan rate methods. The results showed the decrease in capacitance was similar at both 10 mV/s and 1 mV/s voltage scan rates.
2. Electrodes were fabricated using higher binder content to improve adhesion of the oxide. The starting capacitance was lower, due to the higher binder content preventing access of the electrolyte to the oxide surface. Measurement of the capacitance showed a similar rate of decrease during cycling.
3. XRD measurements performed on the electrode materials before and after the electrochemical cycling indicated an increase in crystallinity of the sample that had undergone the cycling testing.
4. The decrease in capacitance is slower for $FeMn_4$ synthesized using a hydrolysis method as opposed to $FeMn_4$ synthesized using the xerogel synthesis method. XRD measurements have shown the metal oxide created using a hydrolysis synthesis method has lower initial crystallinity. However, the performance of electrodes fabricated with either type of $FeMn_4$ shows substantial degradation in the capacitance during cycling in an aqueous electrolyte.
5. Use of KCl in water as the electrolyte results in lower specific capacitance, but the capacitance appears more stable under limited cycling. We believe the Cl ions do not react at the surface, but instead, the specific capacitance arises solely from the double layer mechanism.
6. We performed initial experiments where additional salts were included in the 1M KOH electrolyte, including salts such as $NaHSO_3$, NaSCN, or K2CO3. The resulting capacitance measurements in most cases showed no substantial difference in the capacitance or stability of the capacitance.

We have also performed a series of experiments to better understand how the oxide/hydroxide composition affects the cycling stability of the measured capacitance. These experiments were conducted by altering the composition of the metal oxide/hydroxide, and measuring the change in the capacitance under constant voltage scan rate conditions, with the following results.

1. Mn appears to have the largest difficulties with stability at high pH.
2. Various compositions of Ni and Co have shown much better cycling stability, while MnNi was not stable under cycling. The capacitance of NiCo was measured >900 F/g at 0.1 mV/s. The capacitance of Ni2Co decreased by less than 2% over the course of 15 voltage sweeps.
3. Addition of small amounts of Fe or Mn to the NiCo compounds did not substantially alter the capacitance or stability.
4. FeNi was stable but had low capacitance.

Example 27

Interfacial Stability Testing in Non-Aqueous Electrolyte

We demonstrated the stability of the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (20/80) as the solvent, using with 0.1M $LiPF_6$. The testing has been performed using galvanic cycling at a current density of 0.1 A/g. The capacitance was measured at 329 F/g during the $4^{th}$ cycle, and 332 F/g during the $15^{th}$ cycle. Other measurements showed the capacitance to be stable for 100 cycles after some initial fluctuation due to interface stabilization.

Example 28

Interfacial Stability Testing in Non-Aqueous Electrolyte

We demonstrated the stability of the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (20/80) as the solvent, using with 0.1M $LiPF_6$. The specific capacitance was measured at a voltage scan rate of 0.1 mV/s. The specific capacitance was measured to be 587 F/g on the 5th voltage cycle.

Example 29

Interfacial Stability Testing in Non-Aqueous Electrolyte

Figure 27:
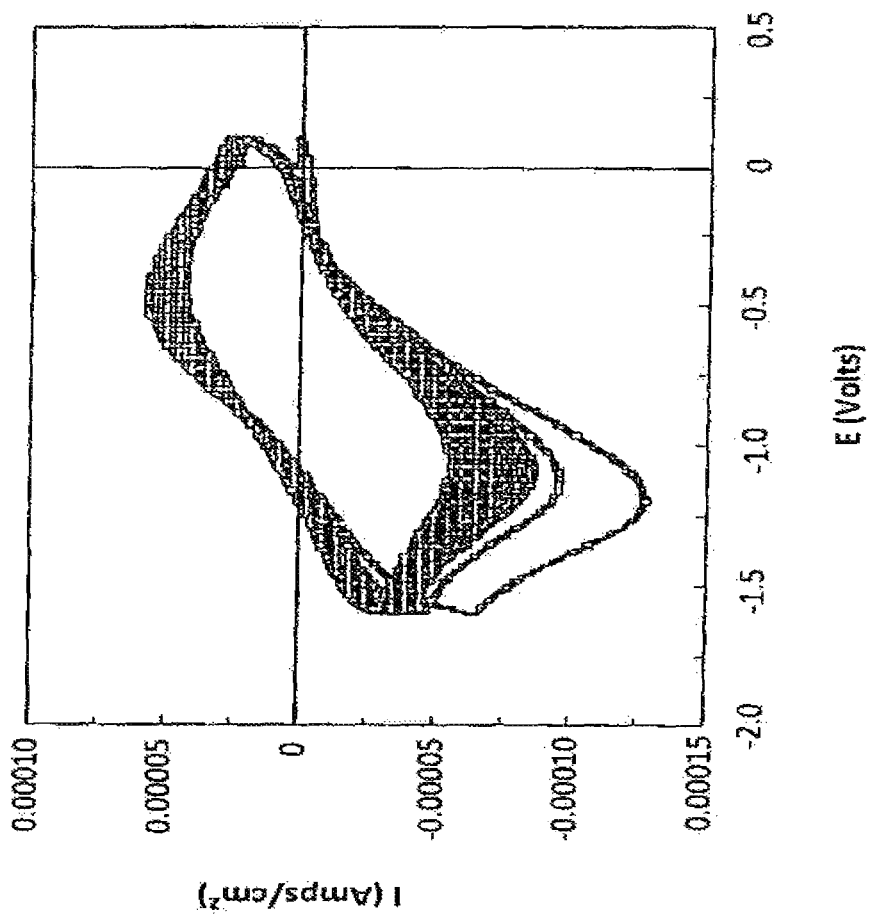
FIG. 27 shows the response of $FeMn_4$ oxide in 50/50 EC/PC with 0.1 M $LiPF_6$.
Figure 28:
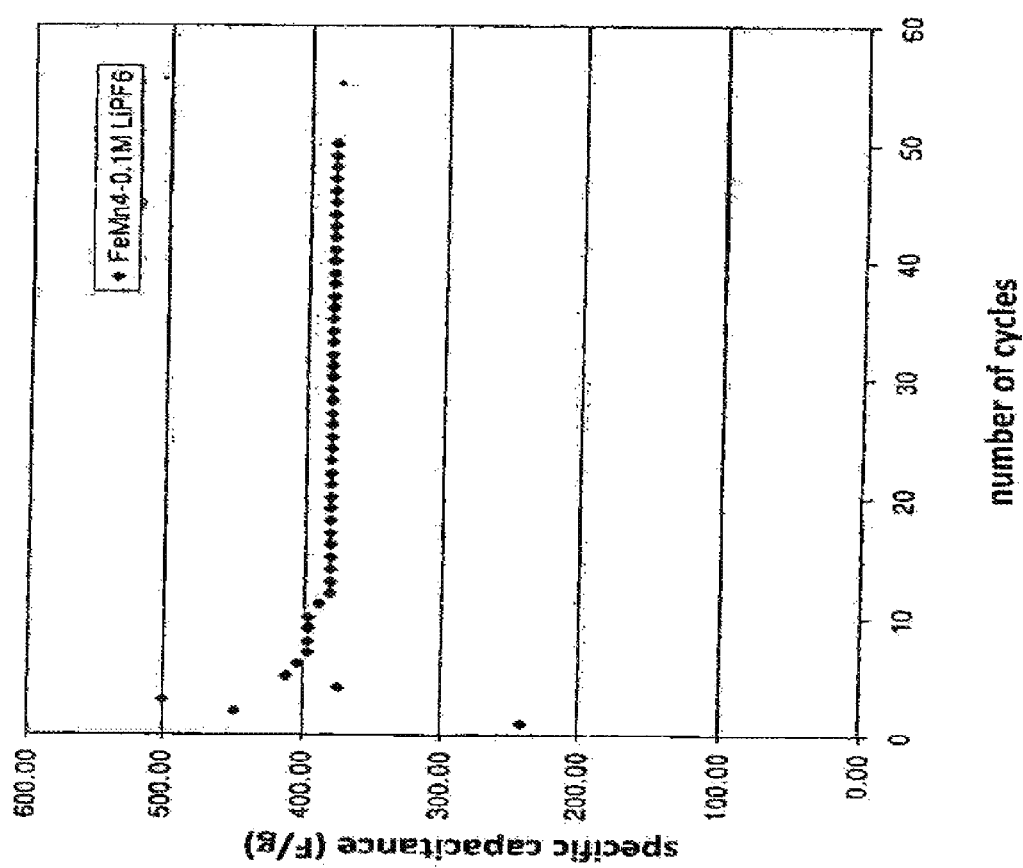
FIG. 28 shows the capacitance over numerous cycles of $FeMn_4$ oxide in 50/50 EC/PC with 0.1 M $LiPF_6$.

We demonstrated the stability of the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (50/50) as the solvent, using with 0.1M $LiPF_6$. The specific capacitance was measured at a voltage scan rate of 1.0 mV/s. FIG. 27 shows the cyclic voltammetry response of the electrode for the first 50 voltage cycles. All the variation in the response depicted in the figure comes in the first 14 cycles. After that, the response lies on a single curve. This is also shown in FIG. 28, which shows the specific capacitance as a function of voltage cycle number. This figure demonstrates that after a number of equilibration cycles, the specific capacitance is very stable Example 30

Interfacial Stability Testing in Non-Aqueous Electrolyte

We demonstrated the stability of the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (20/80) as the solvent, using with 2.5M $LiPF_6$. The electrode was first pre-charged at a current density of 0.28 mA. The specific capacitance was then measured at a voltage scan rate of 0.5 mV/s. It was found that the number of voltage cycles needed before equilibration was reduced. However, cycling stability was unchanged.

Example 31

Full-Cell Measurement of Specific Capacitance in Non-Aqueous Electrolyte

Figure 29:
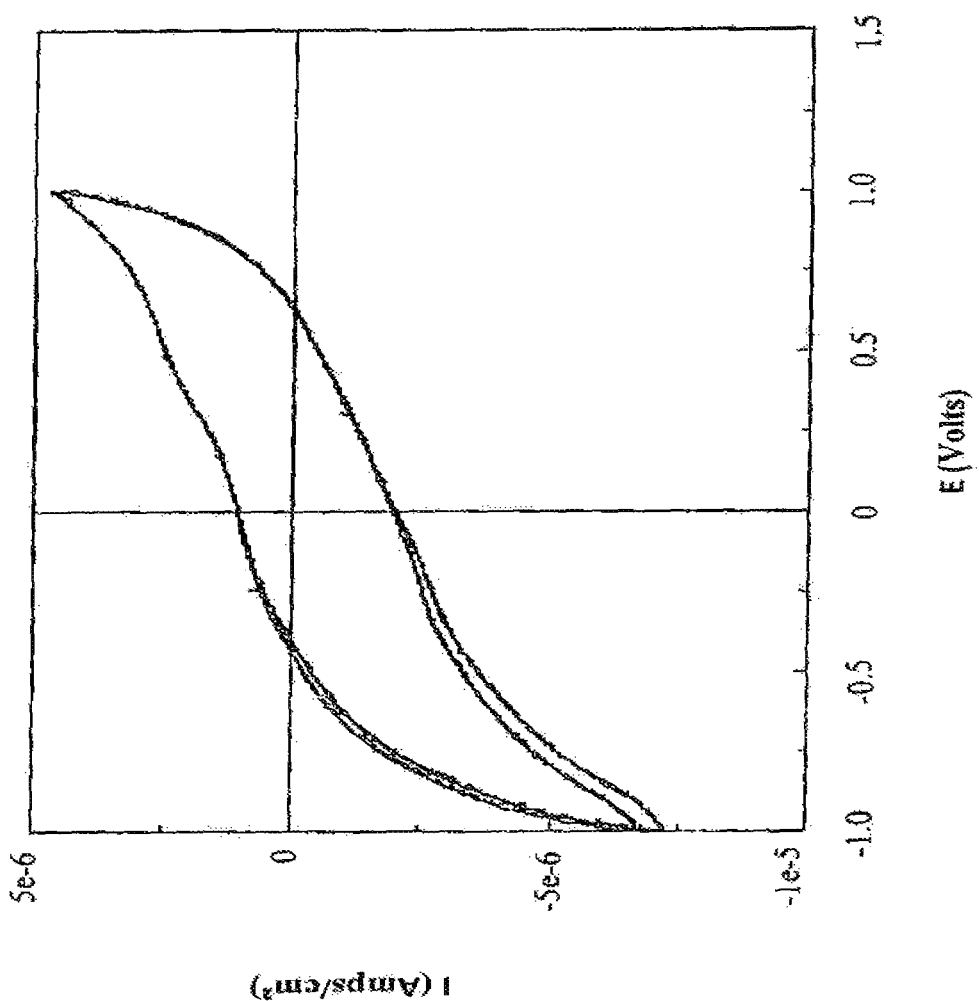
FIG. 29 shows the capacitance of $FeMn_4$ oxide in 50/50 EC/PC with 0.1 M $LiPF_6$ in a full-cell configuration.

We demonstrated the stability of the specific capacitance of FeMn4 in non-aqueous electrolytes. Electrodes were fabricated using FeMn4 synthesized by the xerogel procedure, using the standard electrode fabrication procedures described previously. The nominal electrode composition was 70% oxide, 25% AB, and 5% binder. Testing was performed with EC/PC (50/50) as the solvent, using with 1.0M $LiPF_6$. The specific capacitance was measured at a voltage scan rate of 1.0 mV/s, using a symmetric full-cell testing configuration. FIG. 29 shows the CV response of the system. The specific capacitance of a single electrode was determined to be 28 F/g.

Example 32

Enhancement of Power Density in Non-Aqueous Electrolyte

The power density of a symmetric supercapacitor is limited by the volume of non-aqueous electrolyte. The reason for the large electrolyte volume is the electrolyte must contain sufficient cations or anions to fully saturate the electrode. The electrolyte can be more than 2/3 of the total cell volume even at 3M concentration. One major factor limiting the salt molarity in non-aqueous electrolytes is the mass of the salt, particularly the anion. For a salt such as LiPF6, with molecular weight of 152, the Li+ cation is contributes only 7 amu to this mass.

Comparison of the CV curves from half-cell and full cell testing using LiPF6 or LiBF4 in EC/PC blends demonstrates that the primary capacitance mechanism in these non-aqueous electrolytes is not reduction/oxidation of the metal oxide, but is due to a combination of double layer formation by the Li+ and/or intercalation of the Li+. Due to its size, the BF4- or PF6-anion contributes little to the voltage of the cell.

A symmetrical supercapacitor with higher power density in non-aqueous electrolytes can be made in the following fashion. Two electrodes are prepared using FeMn4 or other metal oxides described herein. Each of the two electrodes is placed into a half-cell electrochemical testing device, using the same solvent and salt to be used for the supercapacitor. Each of the two electrodes is tested using galvanic cycling until the measured capacitance has stabilized. The galvanic cycling of each electrode is then halted at the point where it is approximately half-charged and each electrode is removed from the test cell. The Li associated with the electrode from the charging will be removed with the electrode.

The supercapacitor is then formed using both partially charged electrodes, with a new amount of the electrolyte solution. The supercapacitor can be formed with less electrolyte than would be used in a conventional device. When formed, there is no potential difference between the electrodes. When voltage is applied across the electrodes, the Li will dissociate from one electrode and move through the electrolyte to the second electrode. At maximum voltage, there will be no Li cations associated with one electrode while the second electrode has approximately been saturated with Li. This supercapacitor required less electrolyte volume because the electrolyte does not contain all the Li used in the system. Instead, the electrolyte facilitates the transfer of Li from one electrode to the other, and so a smaller electrolyte volume is possible. The potential difference between the two electrodes will be slightly smaller than would exist for the conventional supercapacitor, but the power density will be substantially larger.

Analysis of Specific Capacitance

The specific capacitance is a function of the composition of the electrode. We analyzed the capacitance for several sets of electrodes discussed earlier to understand how composition is related to measured performance. Table 3 summarizes the measured capacitance for electrodes with iron-manganese oxides, using Nafion as the binder (5 wt %) and AB as the conductive material. All data was measured in 1M KOH at 10 mV/s.

Analysis of the results shows the specific capacitance can be approximated as:
For Fe2Mn3

Specific capacitance=−19109(oxide weight)+53285 (carbon black volume)+278.5

For other mole ratios

Specific capacitance=17748.6(sample weight)− 339567(binder volume)−463.0357

All r values are above 0.9

Similar analysis can be applied to other sets of data, leading to the following relations
For FeMn4 with PTFE binder Specific capacitance=−1689.9(oxide weight)+1151.7 (sample weight)+604.3 $r$=0.92

For Fe2Mn3 with Nafion binder at 1 mV/s

Specific capacitance=−1532.9(sample weight)+1728.1 (oxide volume)+252.7 $r$=0.93

Effect of Calcination

Figure 30:
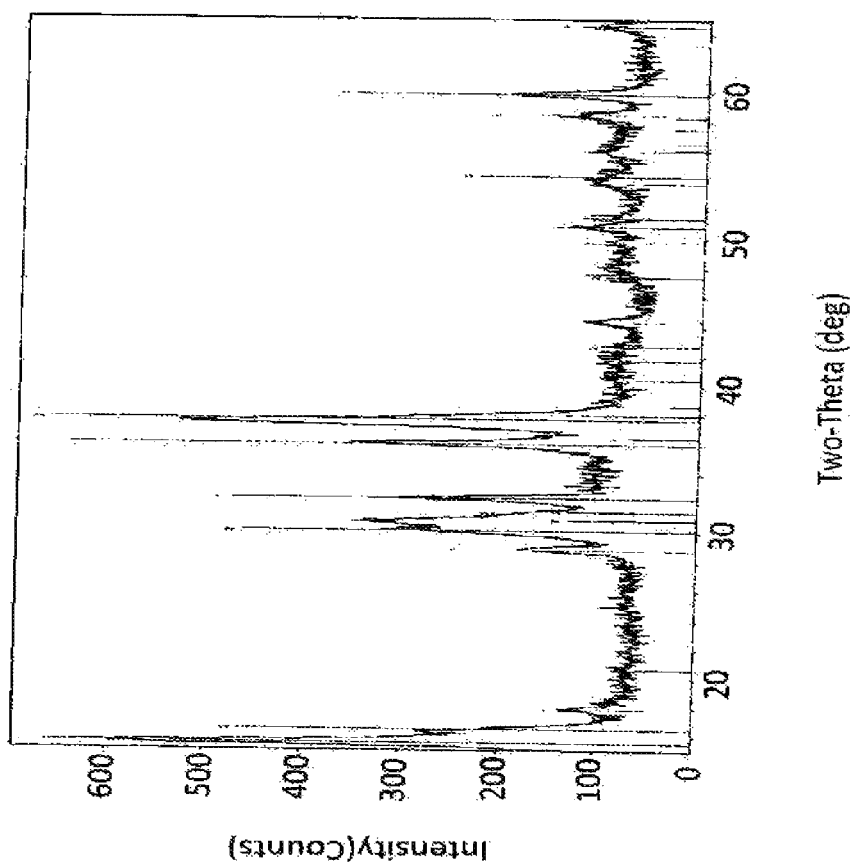
FIG. 30 shows an x-ray diffraction (XRD) plot of $FeMn_4$ oxide dried at 50° C.
Figure 31:
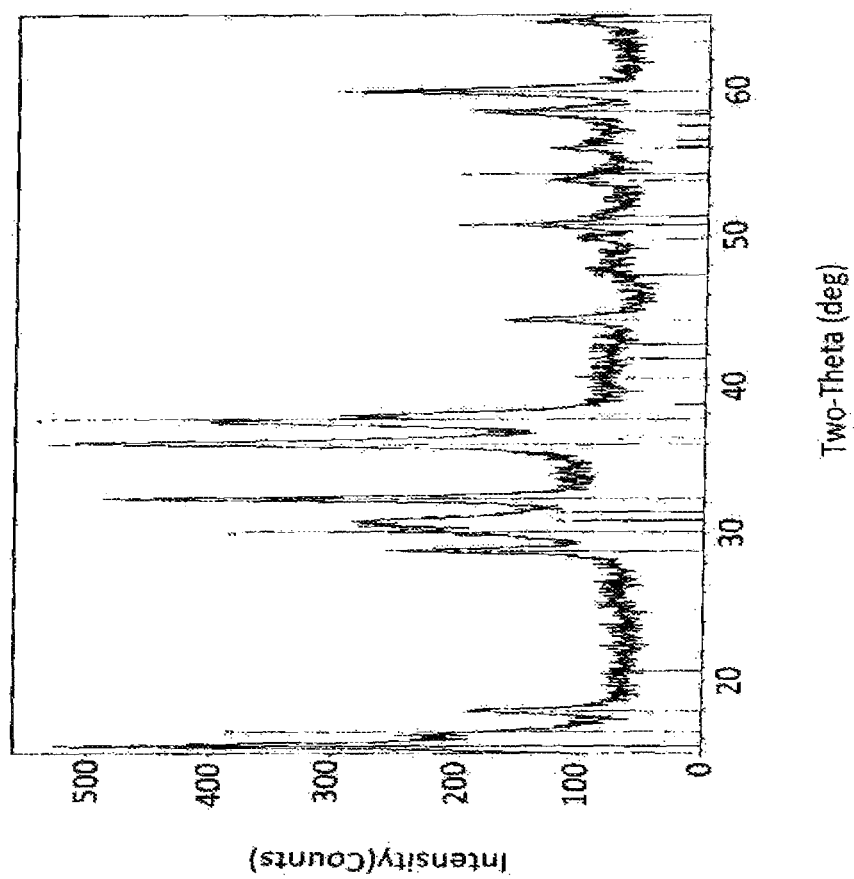
FIG. 31 shows an x-ray diffraction (XRD) plot of $FeMn_4$ oxide dried at 100° C.
Figure 32:
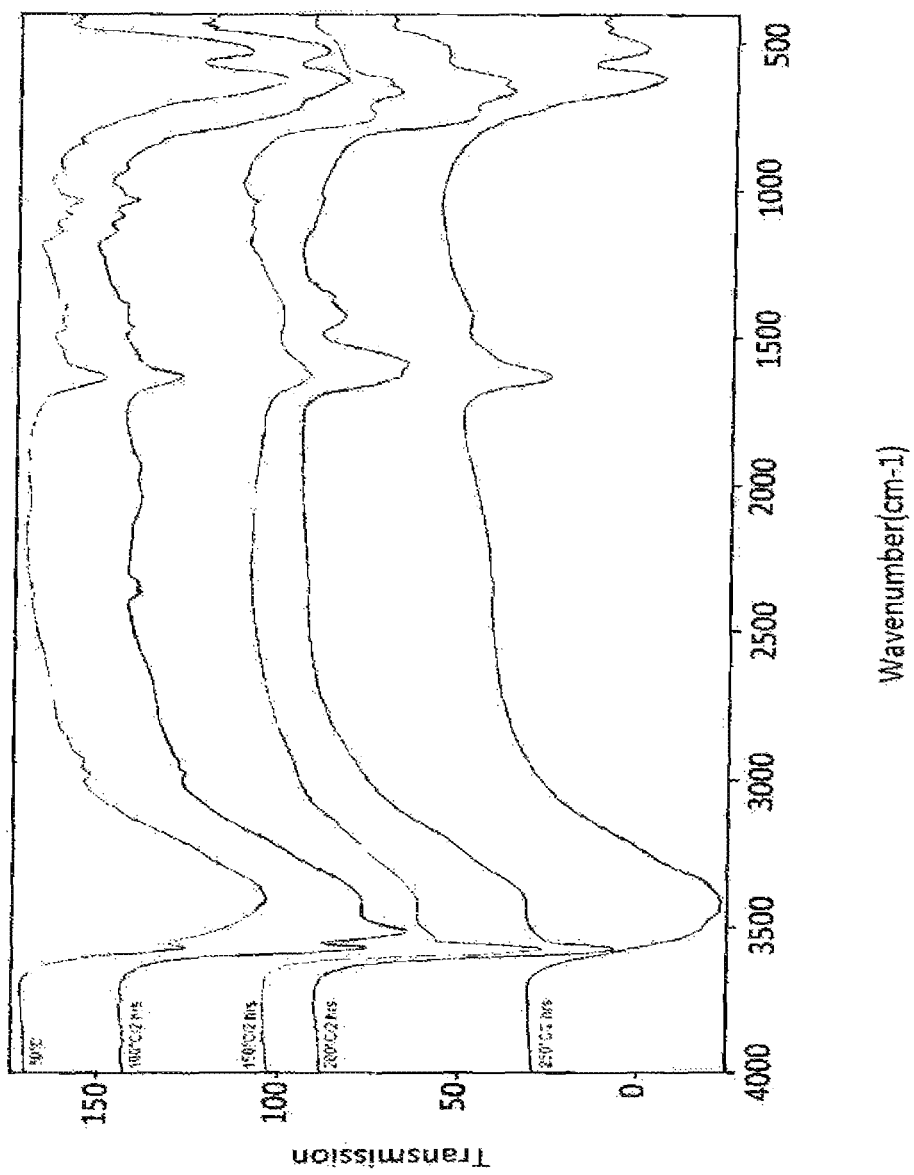
FIG. 32 shows infrared (IR) spectra of $FeMn_4$ oxide after calcination at 5 different temperatures.

The effect of calcinations was observed by taking a XRD measurement of samples dried at 50° C. (FIG. 30) and 100° C. (FIG. 31). Comparison of the results shows with increasing drying temperature, more $Mn(OH)_3Cl$ transformed into $Mn_3O_4$. The heat-treated samples were also investigated using IR analysis, with the results shown in FIG. 32. As seen in the Figure, increasing the temperature from 50° C. to 200° C. reduced the area of the hydroxyl peak, although a very sharp absorption peak remains. The sample heat treated at 250° C. no longer exhibits this sharp peak, but the spectrum may indicate the presence of adsorbed water. Qualitatively there is agreement between the XRD and IR results, with the amount of hydroxyl decreasing with increasing temperature.

What is claimed:

1. A capacitor comprising: a first electrode, wherein the first electrode comprises: a metal oxide comprising Mn and Fe in a molar ratio of 3:1 to 5:1; an electrolyte; a second electrode; and a circuit that can form an electrical pathway between the first electrode and the second electrode.

2. The capacitor of claim 1 wherein the first electrode comprises Mn and Fe in a molar ratio of 3.5:1 to 4.5:1.

3. The capacitor of claim 1 wherein the metals in the metal oxide consist essentially of Mn and Fe.

4. The capacitor of claim 1 wherein the metal oxide is characterizable by an absorption band in the infrared region between 1000 and 1100 $cm^{-1}$.

5. The capacitor of claim 1 wherein the first electrode comprises 5 weight % or less of binder.

TABLE 3

| Oxide | Sample Wt | Spcific Cap F/g | Oxide wt | Oxide Vol. | CB Wt | CB Vol. | Binder Weight | Binder Vol. | Fe/Mn |
|---|---|---|---|---|---|---|---|---|---|
| Fe2Mn1 | 0.9 | 218 | 0.63 | 0.188 | 0.225 | 0.112 | 0.045 | 0.028 | 2 |
| Fe1Mn1 | 0.95 | 192 | 0.665 | 0.2 | 0.2375 | 0.119 | 0.0475 | 0.03 | 1 |
| Fe1Mn1 | 0.9 | 131 | 0.63 | 0.189 | 0.225 | 0.112 | 0.045 | 0.028 | 1 |
| Fe2Mn3 | 0.85 | 284 | 0.595 | 0.179 | 0.212 | 0.106 | 0.0425 | 0.027 | 0.67 |
| Fe2Mn3 | 0.3 | 245 | 0.21 | 0.063 | 0.075 | 0.037 | 0.015 | 0.0095 | .67 |
| Fe2Mn3 | 1.5 | 287 | 1.05 | 0.317 | 0.375 | 0.187 | 0.075 | 0.047 | .67 |
| Fe2Mn3 | 2.6 | 234 | 1.82 | 0.549 | 0.65 | 0.325 | 0.13 | 0.082 | .67 |
| Fe2Mn3 | 5.6 | 181 | 3.92 | 1.1825 | 1.4 | 0.7 | 0.28 | 0.178 | .67 |
| Fe1Mn2 | 1 | 299 | 0.7 | 0.212 | 0.25 | 0.125 | 0.05 | 0.0316 | .5 |
| Fe1Mn3 | 1 | 254 | 0.7 | 0.213 | 0.25 | 0.125 | 0.05 | 0.0316 | .33 |
| Fe1Mn4 | 1.1 | 308 | 0.77 | 0.234 | 0.275 | 0.138 | 0.055 | 0.0348 | .25 |
| Fe1Mn4 | 1.1 | 356 | 0.77 | 0.234 | 0.125 | 0.062 | 0.055 | 0.035 | .25 |

6. The capacitor of claim 5 wherein the first electrode further comprises carbon.

7. The capacitor of claim 1 wherein the first electrode has a mass in the range of 0.1 to 2 mg.

8. The capacitor of claim 7 wherein the first electrode comprises a specific capacitance of at least 500 F/g if measured at 1 mV/s in 1M KOH aqueous electrolyte.

9. The capacitor of claim 1 wherein the first electrode comprises 40 to 80 weight % metal oxide nanoparticles and 15 to 60 weight % carbon.

10. The capacitor of claim 9 wherein the first electrode comprises at least 5 weight % carbon nanotubes.

11. The capacitor of claim 1 wherein the metal oxide further comprises Ni, Co, or a combination of Ni and Co.

12. The capacitor of claim 1 wherein the first electrode is characterizable by an x-ray diffraction spectrum in which the peaks due to a crystalline hydroxide compound are larger than the peaks due to crystalline oxide compounds.

13. The capacitor of claim 1 wherein the electrolyte is a nonaqueous liquid.

14. A capacitor comprising: an electrode, and wherein the electrode comprises: a metal oxide comprising Ni, Co, and Fe; wherein the Ni and Co are present in a Ni/Co molar ratio in the range of 0.5 to 2 and Fe and Ni are present in a Ni/Fe molar ratio in the range of 1.0 to 10.

15. The capacitor of claim 14 wherein the electrode further comprises Mn.

16. A solar energy system comprising a first electrode, wherein the first electrode comprises: a metal oxide comprising Mn and Fe in a molar ratio of 3:1 to 5:1; an electrolyte; a second electrode; and a circuit that can form an electrical pathway between the first electrode and the second electrode; and a photovoltaic cell.

* * * * *

UNITED STATES PATENT AND TRADEMARK OFFICE
CERTIFICATE OF CORRECTION

PATENT NO. : 9,007,742 B2  Page 1 of 1
APPLICATION NO. : 13/262621
DATED : April 14, 2015
INVENTOR(S) : Steven M. Risser et al.

It is certified that error appears in the above-identified patent and that said Letters Patent is hereby corrected as shown below:

Title page
Item (75) Inventors: "Homero Castenada-Lopez" should read --Homero Castaneda-Lopez--

Signed and Sealed this
Ninth Day of February, 2016

Michelle K. Lee
*Director of the United States Patent and Trademark Office*